(12) United States Patent
Sano et al.

(10) Patent No.: US 9,102,094 B2
(45) Date of Patent: Aug. 11, 2015

(54) RAIL SUPPORT DEVICE AND SHEET STRETCHING METHOD

(75) Inventors: Takayoshi Sano, Fuji (JP); Satoru Nitta, Numazu (JP); Hiromu Saijyo, Suntou-Gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 809 days.

(21) Appl. No.: 13/321,195

(22) PCT Filed: May 12, 2010

(86) PCT No.: PCT/JP2010/058003
§ 371 (c)(1),
(2), (4) Date: Nov. 18, 2011

(87) PCT Pub. No.: WO2010/134452
PCT Pub. Date: Nov. 25, 2010

(65) Prior Publication Data
US 2012/0068376 A1    Mar. 22, 2012

(30) Foreign Application Priority Data

May 19, 2009 (JP) .................................. 2009-121154

(51) Int. Cl.
*B29C 55/08* (2006.01)
*B29C 55/20* (2006.01)
*B29C 55/16* (2006.01)

(52) U.S. Cl.
CPC ................. *B29C 55/20* (2013.01); *B29C 55/08* (2013.01); *B29C 55/165* (2013.01)

(58) Field of Classification Search
CPC ...... B29C 55/08; B29C 55/20; B29C 55/165; B29C 55/16

USPC ......... 26/73, 89, 91, 93; 425/325, 363, 403.1, 425/DIG. 41, DIG. 17
See application file for complete search history.

(56) References Cited

U.S. PATENT DOCUMENTS 4,080,692 A * 3/1978 Parrillo et al. .................... 26/91
5,416,959 A * 5/1995 Forrest, Jr. ......................... 26/73
(Continued)

FOREIGN PATENT DOCUMENTS

| JP | 01-139456 | 5/1989 |
| JP | 10-337773 | 12/1998 |

(Continued)

OTHER PUBLICATIONS

German Office Action issued in DE 11 2010 002 030.2 dated Jan. 29, 2013.

(Continued)

*Primary Examiner* — Joseph S Del Sole
*Assistant Examiner* — Thukhanh T Nguyen
(74) *Attorney, Agent, or Firm* — DLA Piper LLP (US)

(57) ABSTRACT

A rail support device installed in a clip chain type sheet stretching apparatus configured to stretch a sheet includes a first rail support member, a second rail support member, and an arc shaped rail support member. The arc shaped rail support member is engaged with each of the connecting portions of the first and second rail support members to form a higher pair. The rail support device is symmetrical with respect to an intersection angle bisecting plane which is a plane developing in a vertical direction and including an intersection angle bisector.

5 Claims, 27 Drawing Sheets

(56) References Cited

U.S. PATENT DOCUMENTS

| | | | | |
|---|---|---|---|---|
| 5,797,172 | A | * | 8/1998 | Hosmer .......................... 26/89 |
| 5,862,574 | A | * | 1/1999 | Poterala .......................... 26/89 |
| 7,073,237 | B1 | | 7/2006 | Cavanagh |

FOREIGN PATENT DOCUMENTS

| | | |
|---|---|---|
| JP | 2003-276082 | 9/2003 |
| JP | 2005-169856 | 6/2005 |
| JP | 2006-198854 | 8/2006 |
| JP | 2007-230143 | 9/2007 |
| WO | WO 2010/134452 | 11/2010 |

OTHER PUBLICATIONS

English Language Translation of German Office Action issued in DE 11 2010 002 030.2 dated Jan. 29, 2013.

PCT/JP2010/058003 International Search Report issued Jun. 15, 2010.

English Lanaguage Abstract of JP 2005-169856 published Jun. 30, 2005.

English Lanaguage Translation of JP 2005-169856 published Jun. 30, 2005.

English Language Abstract of JP 2003-276082 published on Sep. 30, 2003.

English Language Translation of JP 2003-276082 published on Sep. 30, 2003.

English Language Abstract of JP 01-139456 published Mar. 31, 1989.

English Language Abstract of JP 10-337773 published Dec. 22, 1998.

English Language Translation of JP 10-337773 published Dec. 22, 1998.

English Language Abstract of JP 2007-230143 published Sep. 13, 2007.

English Language Translation of JP 2007-230143 published Sep. 13, 2007.

English Language Abstract of JP 2006-198854 published Aug. 3, 2006.

English Language Translation of JP 2006-198854 published Aug. 3, 2006.

\* cited by examiner

FIG. 4
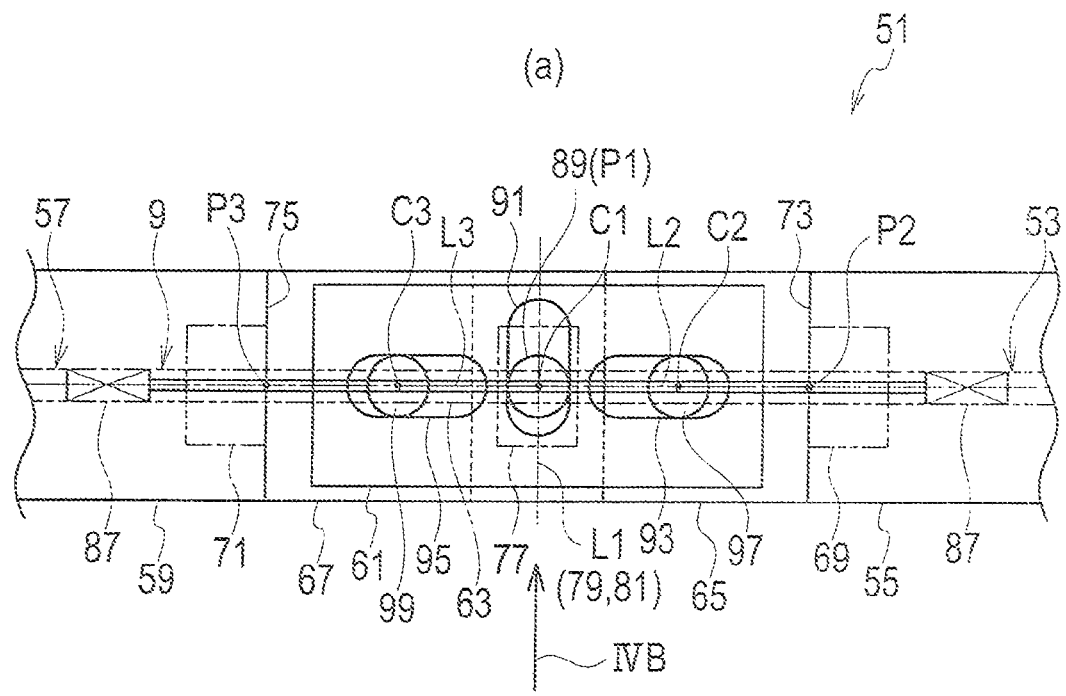
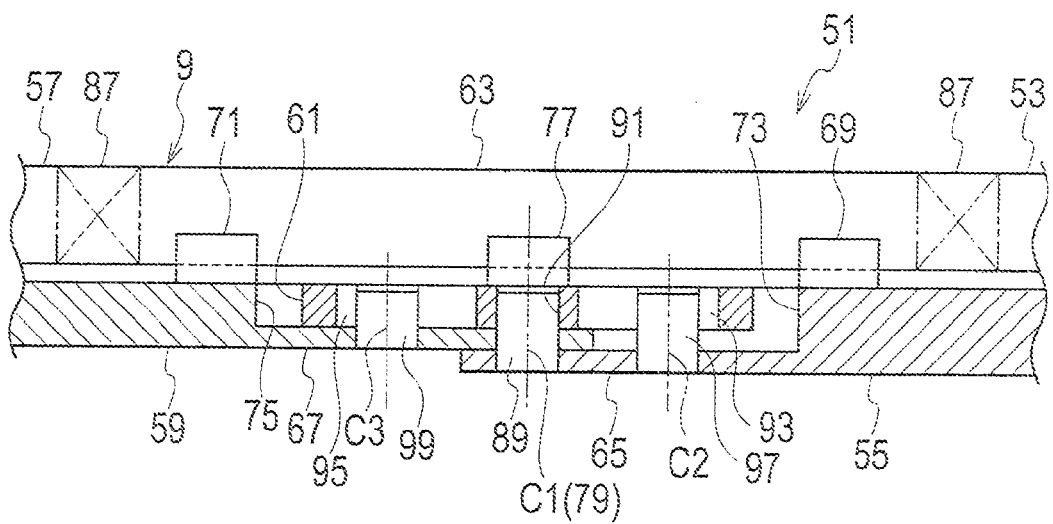

FIG. 6
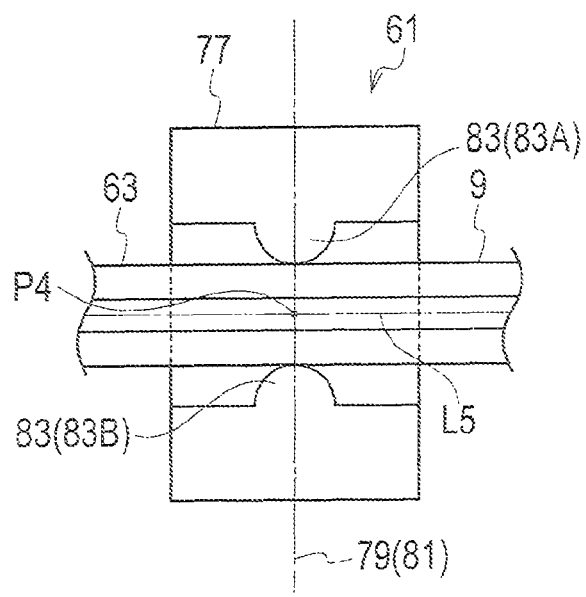
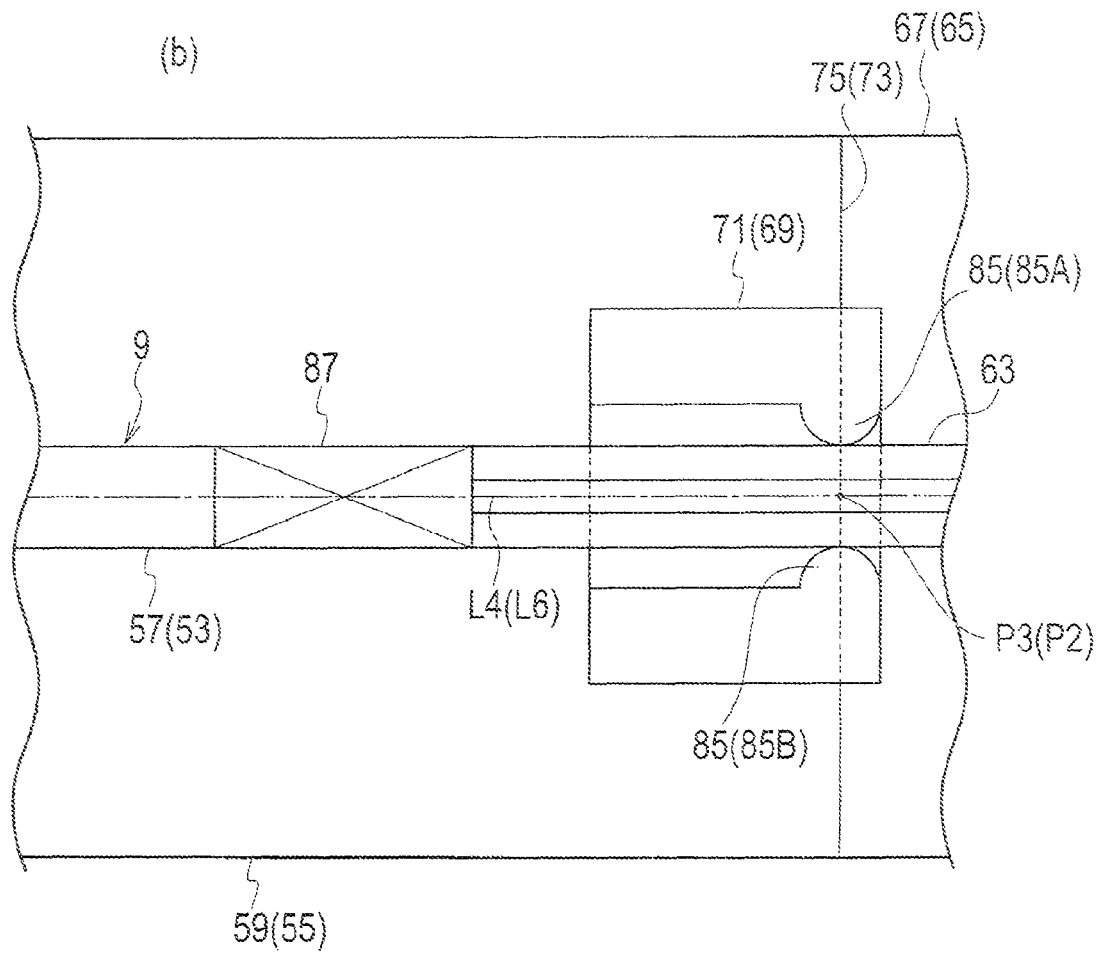

FIG. 8
(a)
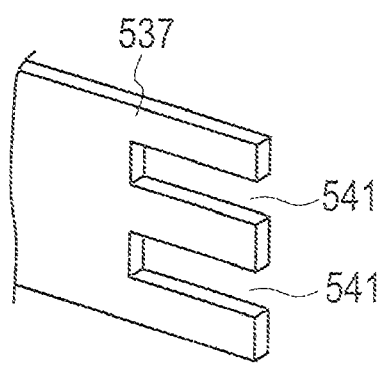
(b)
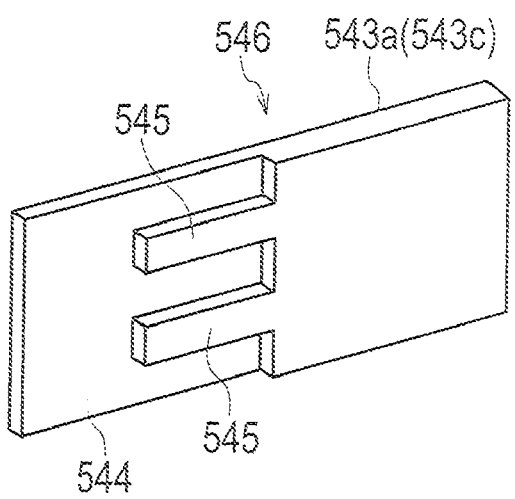

FIG. 10

$$\overline{C1Td} = R/\cos\theta - R$$
$$= R(1/\cos\theta - 1) \quad\text{———(f101)}$$

$$R = (A/\tan\theta) \quad\text{———(f102)}$$

$$\overline{C1Td} = (A/\tan\theta)(1/\cos\theta - 1)$$
$$= (A/\sin\theta)(1-\cos\theta) \quad\text{———(f103)}$$

$$\overline{C1Ud} = B\sin\theta \quad\text{———(f104)}$$

FIG. 11

| θ | Td | CHANGE RATIO Td1/Td2 | Ud | CHANGE RATIO Ud1/Ud2 |
|---|---|---|---|---|
| 0.1 | 0.00087266 × A |  | 0.00174533 × B |  |
| 1 | 0.00872687 × A | 0.10 | 0.01745241 × B | 0.10 |
| 5 | 0.04366094 × A | 0.20 | 0.08715574 × B | 0.20 |
| 10 | 0.08748866 × A | 0.50 | 0.17364818 × B | 0.50 |
| 15 | 0.1316525 × A | 0.66 | 0.25881905 × B | 0.67 |
| 20 | 0.17632698 × A | 0.75 | 0.34202014 × B | 0.76 |
| 25 | 0.22169466 × A | 0.80 | 0.42261826 × B | 0.81 |
| 30 | 0.26794919 × A | 0.83 | 0.5 × B | 0.85 |
| 35 | 0.31529879 × A | 0.85 | 0.57357644 × B | 0.87 |
| 40 | 0.36397023 × A | 0.87 | 0.64278761 × B | 0.89 |
| 45 | 0.41421356 × A | 0.88 | 0.70710678 × B | 0.91 |
| 50 | 0.16630766 × A | 0.89 | 0.76604444 × B | 0.92 |
| 55 | 0.52056705 × A | 0.90 | 0.81915204 × B | 0.94 |
| 60 | 0.57736027 × A | 0.90 | 0.8660254 × B | 0.95 |
| 70 | 0.70020754 × A | 0.82 | 0.93969262 × B | 0.92 |
| 80 | 0.83909963 × A | 0.83 | 0.98480775 × B | 0.95 |
| 90 | 1 × A | 0.84 | 1 × B | 0.98 |
| 100 | 1.19175359 × A | 0.84 | 0.98480775 × B | 1.02 |

FIG. 12

$$R = A/\tan\theta \quad \text{(f121)}$$

$$P = A/\sin\theta - B\sin\theta \quad \text{(f122)}$$

$$A/\tan\theta = A/\sin\theta - B\sin\theta \quad \text{(f123)}$$

$$\begin{aligned}B\sin\theta &= A/\sin\theta - A/\tan\theta \\ &= A/\sin\theta - A\cos\theta/\sin\theta \\ &= A(1-\cos\theta)/\sin\theta\end{aligned} \quad \text{(f124)}$$

$$B/A = (1-\cos\theta)/\sin^2\theta \quad \text{(f125)}$$

FIG. 13

| $\theta$ | B/A FOR R=P |
|---|---|
| 1 | 0.500038079 |
| 5 | 0.500953139 |
| 10 | 0.503822133 |
| 20 | 0.515545602 |
| 30 | 0.535898385 |
| 40 | 0.566227166 |
| 45 | 0.585786438 |
| 46 | 0.590089435 |
| 50 | 0.608721416 |
| 60 | 0.666666667 |
| 70 | 0.745145298 |
| 80 | 0.852044096 |
| 90 | 1 |

FIG. 14

$$R - P = A/\tan\theta - (A/\sin\theta - B\sin\theta) \quad \text{(f141)}$$

$$B/A = 0.5, \text{ i.e., } B = A/2 \quad \text{(f142)}$$

$$\begin{aligned}
R - P &= A/\tan\theta - (A/\sin\theta - (A/2)\sin\theta) \\
&= A(1/\tan\theta - 1/\sin\theta + (1/2)\sin\theta) \\
&= A(1/\tan\theta - 1/\sin\theta + (1/2)\sin\theta) \\
&= A(1/\tan\theta - 1/\sin\theta + (1/2)\sin\theta) \quad \text{(f143)}
\end{aligned}$$

$$(R - P)/A = 1/\tan\theta - 1/\sin\theta + (1/2)\sin\theta \quad \text{(f144)}$$

| θ | (R-P)/A |
|---|---|
| 1 | 0.0000 |
| 5 | -0.0001 |
| 10 | -0.0007 |
| 15 | -0.0022 |
| 20 | -0.0053 |
| 25 | -0.0104 |
| 30 | -0.0179 |
| 35 | -0.0285 |
| 40 | -0.0426 |
| 45 | -0.0607 |
| 50 | -0.0833 |

(b)

| θ | R (mm) | P (mm) | R-P (mm) | (R-P)/A |
|---|---|---|---|---|
| 1 | 8593.49 | 8593.49 | 0.00 | 0.0000 |
| 5 | 1714.51 | 1714.52 | -0.01 | -0.0001 |
| 7.5 | 1139.36 | 1139.41 | -0.04 | -0.0003 |
| 10 | 850.69 | 850.79 | -0.10 | -0.0007 |
| 15 | 559.81 | 560.14 | -0.34 | -0.0022 |
| 20 | 412.12 | 412.92 | -0.80 | -0.0053 |
| 21 | 390.76 | 391.69 | -0.92 | -0.0062 |
| 21.5 | 380.80 | 381.79 | -0.99 | -0.0066 |
| 22 | 371.26 | 372.32 | -1.06 | -0.0071 |
| 22.5 | 362.13 | 363.27 | -1.14 | -0.0076 |
| 23 | 353.38 | 354.59 | -1.21 | -0.0081 |
| 25 | 321.68 | 323.23 | -1.56 | -0.0104 |
| 30 | 259.81 | 262.50 | -2.69 | -0.0179 |
| 35 | 214.22 | 218.50 | -4.28 | -0.0285 |
| 40 | 178.76 | 185.15 | -6.39 | -0.0426 |
| 45 | 150.00 | 159.10 | -9.10 | -0.0607 |
| 50 | 125.86 | 138.36 | -12.49 | -0.0833 |

FIG. 18

$$R(upper) = (A/\tan\theta) + W2 \quad\text{(f181)}$$

$$R(lower) = (A/\tan\theta) - W1 \quad\text{(f182)}$$

$$R(center) = A/\tan\theta \quad\text{(f183)}$$

$$P(upper) = A/\sin\theta - B\sin\theta + W2 \quad\text{(f184)}$$

$$P(lower) = A/\sin\theta - B\sin\theta - W1 \quad\text{(f185)}$$

$$P(center) = A/\sin\theta - B\sin\theta \quad\text{(f186)}$$

$$\begin{aligned}R(upper) - P(upper) &= \{(A/\tan\theta) + W2\} - \{A/\sin\theta - B\sin\theta + W2\} \\ &= (A/\tan\theta) - (A/\sin\theta - B\sin\theta)\end{aligned} \quad\text{(f187)}$$

$$\begin{aligned}R(lower) - P(lower) &= \{(A/\tan\theta) - W1\} - \{A/\sin\theta - B\sin\theta - W1\} \\ &= (A/\tan\theta) - (A/\sin\theta - B\sin\theta)\end{aligned} \quad\text{(f188)}$$

$$R(center) - P(center) = (A/\tan\theta) - (A/\sin\theta - B\sin\theta) \quad\text{(f189)}$$

FIG. 26

$R = A/\tan\theta$ ────────── (f261)

$P(\text{center}) = A/\sin\theta - B\sin\theta$ ────────── (f262)

DISTANCE BETWEEN POINTS O AND $x = A/\tan\theta - W$ ────────── (f263)

DISTANCE BETWEEN POINTS O AND $y = (A/\tan\theta - W)/\cos\theta$ ────────── (f264)

DISTANCE BETWEEN POINTS c AND $y = B - W\tan\theta$ ────────── (f265)

DISTANCE BETWEEN POINTS y AND $z = (B - W\tan\theta)\sin\theta$ ────────── (f266)

DISTANCE BETWEEN POINTS O AND $z$ = (DISTANCE BETWEEN POINTS O AND y) − (DISTANCE BETWEEN POINTS y AND z)
$= ((A/\tan\theta - W)/\cos\theta) - ((B - W\tan\theta)\sin\theta)$ ────────── (f267)

$P(\text{lower})$ = (DISTANCE BETWEEN POINTS O AND z) + W
$= ((A/\tan\theta - W)/\cos\theta) - ((B - W\tan\theta)\sin\theta) + W$
$= ((A/\cos\theta/\sin\theta - W)/\cos\theta) - ((B - W\tan\theta)\sin\theta) + W$
$= (A/\sin\theta - W/\cos\theta) - (B\sin\theta - W\tan\theta\sin\theta) + W$
$= (A/\sin\theta - B\sin\theta) + (W + W\tan\theta\sin\theta - W/\cos\theta)$
$= (A/\sin\theta - B\sin\theta) + W(1 + \tan\theta\sin\theta - 1/\cos\theta)$
$= (A/\sin\theta - B\sin\theta) + W(1 + (\sin^2\theta)/\cos\theta - (\sin^2\theta + \cos^2\theta)/\cos\theta)$
→ SINCE $\sin^2\theta + \cos^2\theta = 1$
$= (A/\sin\theta - B\sin\theta) + W(1 - (\cos^2\theta)/\cos^2\theta)$
$= (A/\sin\theta - B\sin\theta) + W(1 - \cos\theta)$ ────────── (f268)

FIG. 27

DISTANCE BETWEEN POINTS O AND $x = A/\tan\theta + W$ ..........(f271)

DISTANCE BETWEEN POINTS O AND $y = (A/\tan\theta + W)/\cos\theta$ ..........(f272)

DISTANCE BETWEEN POINTS c AND $y = B + W\tan\theta$ ..........(f273)

DISTANCE BETWEEN POINTS y AND $z = (B + W\tan\theta)\sin\theta$ ..........(f274)

DISTANCE BETWEEN POINTS O AND $z$ = (DISTANCE BETWEEN POINTS O AND $y$) − (DISTANCE BETWEEN POINTS y AND z)
$= ((A/\tan\theta + W)/\cos\theta) - ((B + W\tan\theta)\sin\theta)$ ..........(f275)

$P(\text{upper}) = $ (DISTANCE BETWEEN POINTS O AND z) − W
$= ((A/\tan\theta + W)/\cos\theta) - ((B + W\tan\theta)\sin\theta) - W$
$= ((A/\cos\theta/\sin\theta + W)/\cos\theta - ((B + W\tan\theta)\sin\theta) - W$
$= (A/\sin\theta + W/\cos\theta) - (B\sin\theta + W\tan\theta\sin\theta) - W$ $= (A/\sin\theta - B\sin\theta) - (W + W\tan\theta\sin\theta - W/\cos\theta)$
$= (A/\sin\theta - B\sin\theta) - W(1 + \tan\theta\sin\theta - 1/\cos\theta)$
$= (A/\sin\theta - B\sin\theta) - W(1 + (\sin^2\theta)/\cos\theta - 1/\cos\theta)$
$= (A/\sin\theta - B\sin\theta) - W((1 + \sin^2\theta)/\cos\theta - (\sin^2\theta + \cos^2\theta)/\cos\theta)$
$\Rightarrow$ SINCE $\sin^2\theta + \cos^2\theta = 1$
$= (A/\sin\theta - B\sin\theta) - W(1 - (\cos^2\theta)/\cos\theta)$
$= (A/\sin\theta - B\sin\theta) - W(1 - \cos\theta)$ ..........(f276)

FIG. 28

$$P(\text{center}) = A/\sin\theta - B\sin\theta = A/\sin\theta - (A/2)\sin\theta$$
$$= A(1/\sin\theta - (1/2)\sin\theta) \quad \text{(f281)}$$

$$P(\text{lower}) = (A/\sin\theta - B\sin\theta) + W(1-\cos\theta)$$
$$= (A/\sin\theta - (A/2)\sin\theta) + W(1-\cos\theta)$$
$$= A(1/\sin\theta - (1/2)\sin\theta) + W(1-\cos\theta) \quad \text{(f282)}$$

$$P(\text{upper}) = (A/\sin\theta - B\sin\theta) - W(1-\cos\theta)$$
$$= (A/\sin\theta - (A/2)\sin\theta) - W(1-\cos\theta)$$
$$= A(1/\sin\theta - (1/2)\sin\theta) - W(1-\cos\theta) \quad \text{(f283)}$$

$$P(\text{center})/A = (1/\sin\theta - (1/2)\sin\theta) \quad \text{(f284)}$$

$$P(\text{lower})/A = (1/\sin\theta - (1/2)\sin\theta) + (W/A)(1-\cos\theta) \quad \text{(f285)}$$

$$P(\text{upper})/A = (1/\sin\theta - (1/2)\sin\theta) - (W/A)(1-\cos\theta) \quad \text{(f286)}$$

$$R/A = 1 - \tan\theta \quad \text{(f287)}$$

| θ | R/A | Pcen/A | Pcen/R |
|---|---|---|---|
| 1 | 57.290 | 57.290 | 1.000 |
| 5 | 11.430 | 11.430 | 1.000 |
| 10 | 5.671 | 5.672 | 1.000 |
| 15 | 3.732 | 3.734 | 1.001 |
| 20 | 2.747 | 2.753 | 1.002 |
| 25 | 2.145 | 2.155 | 1.005 |
| 30 | 1.732 | 1.750 | 1.010 |
| 35 | 1.428 | 1.457 | 1.020 |
| 40 | 1.192 | 1.234 | 1.036 |
| 45 | 1.000 | 1.061 | 1.061 |

(b)

| θ | R/A | W/A=0 | | W/A=0.1 | | W/A=0.2 | | W/A=0.5 | | W/A=1.0 | |
|---|---|---|---|---|---|---|---|---|---|---|---|
|   |   | Plow | Plow/R | Plow | Plow/R | Plow | Plow/R | Plow | Plow/R | Plow | Plow/R |
| 1 | 57.290 | 57.290 | 1.000 | 57.290 | 1.000 | 57.290 | 1.000 | 57.290 | 1.000 | 57.290 | 1.000 |
| 5 | 11.430 | 11.430 | 1.000 | 11.431 | 1.000 | 11.431 | 1.000 | 11.432 | 1.000 | 11.434 | 1.000 |
| 10 | 5.671 | 5.672 | 1.000 | 5.673 | 1.000 | 5.675 | 1.001 | 5.680 | 1.001 | 5.687 | 1.003 |
| 15 | 3.732 | 3.734 | 1.001 | 3.738 | 1.002 | 3.741 | 1.002 | 3.751 | 1.005 | 3.768 | 1.010 |
| 20 | 2.747 | 2.753 | 1.002 | 2.759 | 1.004 | 2.765 | 1.006 | 2.783 | 1.013 | 2.813 | 1.024 |
| 25 | 2.145 | 2.155 | 1.005 | 2.164 | 1.009 | 2.174 | 1.014 | 2.202 | 1.027 | 2.249 | 1.049 |
| 30 | 1.732 | 1.750 | 1.010 | 1.763 | 1.018 | 1.777 | 1.026 | 1.817 | 1.049 | 1.884 | 1.088 |
| 35 | 1.428 | 1.457 | 1.020 | 1.475 | 1.033 | 1.493 | 1.045 | 1.547 | 1.083 | 1.638 | 1.147 |
| 40 | 1.192 | 1.234 | 1.036 | 1.258 | 1.055 | 1.281 | 1.075 | 1.351 | 1.134 | 1.468 | 1.232 |
| 45 | 1.000 | 1.061 | 1.061 | 1.090 | 1.090 | 1.119 | 1.119 | 1.207 | 1.207 | 1.354 | 1.354 |

(c)

| θ | R/A | W/A=0 | | W/A=0.1 | | W/A=0.2 | | W/A=0.5 | | W/A=1.0 | |
|---|---|---|---|---|---|---|---|---|---|---|---|
|   |   | Pupp | Pupp/R | Pupp | Pupp/R | Pupp | Pupp/R | Pupp | Pupp/R | Pupp | Pupp/R |
| 1 | 57.290 | 57.290 | 1.000 | 57.290 | 1.000 | 57.290 | 1.000 | 57.290 | 1.000 | 57.290 | 1.000 |
| 5 | 11.430 | 11.430 | 1.000 | 11.430 | 1.000 | 11.429 | 1.000 | 11.428 | 1.000 | 11.426 | 1.000 |
| 10 | 5.671 | 5.672 | 1.000 | 5.670 | 1.000 | 5.669 | 0.999 | 5.664 | 0.999 | 5.657 | 0.997 |
| 15 | 3.732 | 3.734 | 1.001 | 3.731 | 1.000 | 3.727 | 0.999 | 3.717 | 0.996 | 3.700 | 0.991 |
| 20 | 2.747 | 2.753 | 1.002 | 2.747 | 1.000 | 2.741 | 0.998 | 2.723 | 0.991 | 2.692 | 0.980 |
| 25 | 2.145 | 2.155 | 1.005 | 2.146 | 1.000 | 2.136 | 0.996 | 2.108 | 0.983 | 2.061 | 0.961 |
| 30 | 1.732 | 1.750 | 1.010 | 1.737 | 1.003 | 1.723 | 0.995 | 1.683 | 0.972 | 1.616 | 0.933 |
| 35 | 1.428 | 1.457 | 1.020 | 1.439 | 1.007 | 1.420 | 0.995 | 1.366 | 0.957 | 1.276 | 0.893 |
| 40 | 1.192 | 1.234 | 1.036 | 1.211 | 1.016 | 1.188 | 0.996 | 1.117 | 0.938 | 1.000 | 0.839 |
| 45 | 1.000 | 1.061 | 1.061 | 1.031 | 1.031 | 1.002 | 1.002 | 0.914 | 0.914 | 0.768 | 0.768 |

FIG. 30

$R = A/\tan\theta$ —————————————————— (f301)

$P(\text{lower}) = (A/\sin\theta - B\sin\theta) + W(1-\cos\theta)$ —————— (f302)

$P(\text{upper}) = (A/\sin\theta - B\sin\theta) - W(1-\cos\theta)$ —————— (f303)

$B/A = (W/A)(1-\cos\theta)/\sin\theta + (1-\cos\theta)/\sin^2\theta$ —————— (f304)

$B/A = -(W/A)(1-\cos\theta)/\sin\theta + (1-\cos\theta)/\sin^2\theta$ —————— (f305)

| θ | B/A FOR R=P W=0 | B/A FOR R=P W=0.1 | B/A FOR R=P W=0.2 | B/A FOR R=P W=0.5 | B/A FOR R=P W=1.0 |
|---|---|---|---|---|---|
| 1 | 0.50003808 | 0.50005331 | 0.50006854 | 0.5001142 | 0.50019038 |
| 5 | 0.50095314 | 0.50133367 | 0.5017142 | 0.5028558 | 0.50475844 |
| 10 | 0.50382713 | 0.50534636 | 0.50686558 | 0.5114233 | 0.51901938 |
| 20 | 0.5155456 | 0.52157634 | 0.52760708 | 0.5456993 | 0.57585298 |
| 22.5 | 0.51978306 | 0.52739511 | 0.53500716 | 0.5578433 | 0.59590353 |
| 23 | 0.52069642 | 0.52864593 | 0.53659545 | 0.560444 | 0.60019157 |
| 25 | 0.52457426 | 0.53394348 | 0.5433127 | 0.5714204 | 0.61826647 |
| 27 | 0.52881891 | 0.53971825 | 0.5506176 | 0.5833156 | 0.63781238 |
| 30 | 0.53589838 | 0.54929584 | 0.5626933 | 0.6028857 | 0.66987298 |
| 40 | 0.56623717 | 0.58963272 | 0.61302828 | 0.6832149 | 0.80019272 |
| 45 | 0.58578644 | 0.61507576 | 0.64436508 | 0.732233 | 0.87867966 |
| 46 | 0.59008943 | 0.6206236 | 0.65115776 | 0.7427602 | 0.89543106 |
| 50 | 0.60872142 | 0.64444266 | 0.68016389 | 0.7873276 | 0.96593381 |
| 60 | 0.66666667 | 0.71666667 | 0.76666667 | 0.9166667 | 1.16666667 |
| 70 | 0.7451453 | 0.81094328 | 0.87674127 | 1.0741352 | 1.40312515 |
| 80 | 0.8520441 | 0.93467928 | 1.01731446 | 1.26522 | 1.67839592 |
| 90 | 1 | 1.1 | 1.2 | 1.5 | 2 |

(b)

| θ | B/A FOR R=P W=0 | B/A FOR R=P W=0.1 | B/A FOR R=P W=0.2 | B/A FOR R=P W=0.5 | B/A FOR R=P W=1.0 |
|---|---|---|---|---|---|
| 1 | 0.50003808 | 0.50002285 | 0.50000762 | 0.4999619 | 0.49988577 |
| 5 | 0.50095314 | 0.50057261 | 0.50019208 | 0.4990505 | 0.49714784 |
| 10 | 0.50382713 | 0.50230791 | 0.50078868 | 0.496231 | 0.48863489 |
| 20 | 0.5155456 | 0.50951486 | 0.50348413 | 0.4853919 | 0.45523822 |
| 22.5 | 0.51978306 | 0.51217102 | 0.50455897 | 0.4817228 | 0.4436626 |
| 23 | 0.52069642 | 0.5127469 | 0.50479739 | 0.4809488 | 0.44120127 |
| 25 | 0.52457426 | 0.51520504 | 0.50583582 | 0.4777282 | 0.43088205 |
| 27 | 0.52881891 | 0.51791956 | 0.50702021 | 0.4743222 | 0.41982543 |
| 30 | 0.53589838 | 0.52250093 | 0.50910347 | 0.4689111 | 0.40192379 |
| 40 | 0.56623717 | 0.54284161 | 0.51944605 | 0.4492594 | 0.33228161 |
| 45 | 0.58578644 | 0.55649712 | 0.52720779 | 0.4393398 | 0.29289322 |
| 46 | 0.59008943 | 0.55955527 | 0.52902111 | 0.4374186 | 0.28474781 |
| 50 | 0.60872142 | 0.57300018 | 0.53727894 | 0.4301152 | 0.25150903 |
| 60 | 0.66666667 | 0.61666667 | 0.56666667 | 0.4166667 | 0.16666667 |
| 70 | 0.7451453 | 0.67934731 | 0.61354933 | 0.4161554 | 0.08716544 |
| 80 | 0.8520441 | 0.76940891 | 0.68677373 | 0.4388682 | 0.02569227 |
| 90 | 1 | 0.9 | 0.8 | 0.5 | 0 |

RAIL SUPPORT DEVICE AND SHEET STRETCHING METHOD

CROSS-REFERENCE TO RELATED APPLICATIONS

This application is a National Stage of International Application No. PCT/JP2010/058003 (not published in English), filed May 12, 2010, which, in turn, claims the benefit of Japanese Patent Application No. 2009-121154, filed May 19, 2009.

TECHNICAL FIELD

The present invention relates to a rail support device and a method for stretching a sheet, for a sheet stretching apparatus, and more specifically, to a rail support device and a method for stretching a sheet for a clip chain type stretching apparatus configured to hold end portions of a sheet, made of a thermoplastic resin for example, by using clip chains and to stretch the sheet while conveying the sheet by running the clip chains.

BACKGROUND ART

As a clip chain type sheet stretching apparatus, there has heretofore been known a clip chain type sheet stretching apparatus in which a pair of clip chains each formed of clips combined in an endless shape are disposed laterally symmetrically, and which is configured to hold both end portions in a width direction of a sheet (film) by using the clips of these clip chains, and to stretch the sheet, in a traverse direction (TD stretch) with the clip chains running along a pair of guide rails disposed laterally symmetrically. A distance between the pair of guide rails of the clip chain type sheet stretching apparatus is gradually expanded in a portion for stretching the sheet in the traverse direction.

In order to change a transverse stretch ratio (a ratio of a distance between a pair of clips at an entrance of the sheet relative to a distance between the pair of clips, at an exit of the sheet), the conventional clip chain type sheet stretching apparatus is provided with a flexible guide rail in a portion for connecting straight guide rails made of rigid bodies to each other, and changes an intersection angle (a curvature radius of the flexible guide rail) between the straight guide rails by folding or unfolding the flexible guide rails at a supporting point by using a handle or a motor.

With a larger length and a smaller thickness, the flexible guide rail has a higher bending property, and therefore can change the intersection angle between the straight guide rails within a larger angular range. However, with a larger length and a smaller thickness, the flexible guide rail lacks rigidity. Accordingly, there is a risk that the flexible guide rail is deformed by a stretching force applied to the clips (a force to pull the sheet in the width direction) and fails to maintain an ideal shape (an arc shape), whereby the clip chains cannot run smoothly.

Patent Literatures 1 and 2 are cited as patent literatures related to the conventional technique.

CITATION LIST

Patent Literature

PLT 1: Japanese Unexamined Patent Application Publication No. Hei 10-33:7773

PLT 2: Japanese Unexamined. Patent Application Publication No. 2005-169656

SUMMARY OF INVENTION

Technical Problem

As described above, having a larger length and a smaller thickness, the flexible guide rail can change the intersection angle between the guide rails within the larger angular range, but may inhibit clip chains from running smoothly.

To address this, there is a conceivable method of maintaining the flexible guide rail in the ideal arc shape by holding an intermediate portion in a longitudinal direction of the flexible guide rail (see the above-described Patent Literatures 1 and 2, for example). However, this method has a problem of complication in a device configuration in order to maintain the flexible guide rail in the ideal arc shape by holding the intermediate portion in the longitudinal direction of the flexible guide rail (a curved portion of the rail).

The present invention has been made in view of the aforementioned problems and an object thereof is to provide a rail support device installed in a clip chain type sheet stretching apparatus configured to hold end portions in a transverse direction of a sheet by using clips of clip chains, and to stretch the sheet while conveying the sheet by running the clip chains in a horizontal direction along rails, the rail support device configured to support the rails, and having a simple configuration in which the rigidity of curved portions of the rails is enhanced.

Meanwhile, another object of the present invention is to provide a method for stretching a sheet using a sheet stretching apparatus employing a rail support device having a simple configuration in which the rigidity of curved portions of rails is enhanced.

Solution to Problem

A first aspect of the present invention is a rail support device installed in a clip chain type sheet stretching apparatus configured to hold an end portion in a transverse direction of a sheet by using clip chains, and to stretch the sheet while conveying the sheet by running the clip chains in a horizontal direction along a rail, the rail support device configured to support the rail and comprising: a first rail support member configured to support a first straight portion of the rail; a second rail support member configured to support a second straight portion of the rail in a direction intersecting the first straight portion; and an arc shaped tail support member configured to support an arc shaped portion of the rail connecting the first and the second straight portions to each other, wherein the first rail support member includes a first connecting portion and a first straight rail support portion being a portion other than the first connecting portion, the second rail support member includes a second connecting portion and a second straight rail support portion being a portion other than the second connecting portion, the first connecting portion and the second connecting portion are engaged with each other, the second rail support is rotatable relative to the first rail support member about a first axis extending in a vertical direction at the first and second connecting portions, the first and second rail support members respectively support the first and second straight portions by the first and second straight rail support portions, the arc shaped rail support member is engaged with each of the first connecting portion and the second connecting portion to form a higher pair, and a unit of the first rail support member, the second rail support member, and the arc shaped rail support member is symmetrical with respect to an intersection angle bisecting plane developing in the vertical direction and including an intersection angle bisector being a straight line passing through an intersection point between a first extended line of the first straight portion and a second extended line of the second straight line and extending in the horizontal direction while bisecting an intersection angle of the first and second extended lines.

A second aspect of the present invention is a rail support device installed in a clip chain type sheet stretching apparatus configured to hold an end portion in a transverse direction of a sheet by using clips of clip chains, and to stretch the sheet while conveying the sheet by running the clip chains in a horizontal direction along a rail, the rail support device configured to support the rail and comprising: a first rail support member configured to support a first straight portion of the rail; a second rail support member configured to support a second straight portion of the rail in a direction intersecting the first straight portion; and an arc shaped rail support member configured to support an arc shaped portion of the rail connecting the first and second straight portions to each other, wherein the first rail support member includes a first connecting portion and a first straight rail support portion being a portion other than the first connecting portion, the second rail support member includes a second connecting portion and a second straight rail support portion being a portion other than the second connecting portion, the first connecting portion and the second connecting portion are engaged with each other, the second rail support is rotatable relative to the first rail support member about a first axis extending in a vertical direction at the first and second connecting portions, the first and second rail support members respectively support the first and second straight portions by the first and second Straight rail support portions with longitudinal directions of the first and second rail support members respectively set to coincide with longitudinal directions of the first and second straight portions, the arc shaped rail support member is engaged with at least one of the first connecting portion and the second connecting portion to form a higher pair so as to rotate relative to the at least one connection portion about the first axis and to move relative to the at least one connection portion along a first straight line passing through the first axis and extending in the horizontal direction, the arc shaped rail support member is engaged with the first connecting portion to form a higher pair so as to rotate relative to the first connecting portion about a second axis extending in the vertical direction at the first connecting portion and to move relative to the first connecting portion along a second straight line passing through the second axis and extending in the horizontal direction, the arc shaped rail support member is engaged with the second connecting portion to form a higher pair so as to rotate relative to the second connecting portion about a third axis extending in the vertical direction at the second connecting portion and to move relative to the second connecting portion along a third straight line passing through the third axis and extending in the horizontal direction, the first axis exists in an intersection angle bisecting plane developing in the vertical direction and including an intersection angle bisector being a straight line passing through an intersection point between an extended line of the first straight portion and an extended line of the second straight line and extending in the horizontal direction while bisecting an intersection angle of the extended lines of the first and second straight portions, the arc shaped rail support member supports the arc shaped portion of the rail in the intersection angle bisecting plane, the first straight line extends in a direction of extension of the intersection angle bisector, the first rail support member and the second, rail support member are symmetrical to each other with respect to the intersection angle bisecting plane, the second straight line extends in the horizontal direction intersecting with the intersection angle bisecting plane, and the third straight line and the second straight line are symmetrical to each other with respect to the intersection angle bisecting plane.

The first straight rail support portion may support the first straight portion at least at a boundary with the first connecting portion in the longitudinal direction, of the first rail support member, and a distance between the intersection angle bisecting plane and the second axis in the longitudinal direction of the first rail support member may be 0.50 to 0.59 times as long as a distance between the intersection angle bisecting plane and the boundary.

The first straight rail support portion may support the first straight portion at least at a boundary with the first connecting portion in the longitudinal direction of the first rail support member, and a distance between the intersection angle bisecting plane and the second axis may be 0.50 times as long as a distance between the intersection angle bisecting plane and the boundary.

The rail may be straight and pass along the first axis when an intersection angle between the first straight portion and the second straight portion is 180°.

The first rail support member and the second rail support member may be rotatable about the first axis by using a columnar first shaft member, the arc shaped rail support member may include a first elongated hole, a second elongated hole, and a third elongated hole, the arc shaped rail support member with the first elongated hole engaged with the first shaft member may be engaged with the first and second connecting portions so as to rotate about the first axis and move along the first straight line relative to the first and second connecting portions, the arc shaped rail support member with the second elongated hole engaged with a columnar second shaft member provided at the first connecting portion may be engaged with the first connecting portion so as to rotate about the second axis and move along the second straight line relative to the first connecting portion, and the arc shaped rail support member with the third elongated hole engaged with a columnar third shaft member provided at the second connecting portion may be engaged with the second connecting portion so as to rotate about the third axis and move along the third straight line relative to the second connecting portion.

A third aspect of the present invention is a method for stretching a sheet comprising: preparing a clip chain type sheet stretching apparatus including a rail support device installed in the clip chain type sheet stretching apparatus configured to hold an end portion in a transverse direction of a sheet by using clips of clip chains, and to stretch the sheet while conveying the sheet by running the clip chains in a horizontal direction along a rail, the rail support device configured to support the rail and including: a first rail support member configured to support a first straight portion of the rail; a second rail support member configured to support a second straight portion of the rail in a direction intersecting the first straight portion; and an, arc shaped rail support member configured to support an arc shaped portion of the rail connecting the first and second straight portions to each other, wherein the first rail support member includes a first connecting portion and a first straight rail support portion being a portion other than the first connecting portion, the second rail support member includes a second connecting portion and a second straight rail support portion being a portion other than the second connecting portion, the first connecting portion and the second connecting portion are engaged with each other, the second rail support is rotatable relative to the first rail support member about a first axis extending in a vertical direction at the first and second connecting portions, the first and second rail support members respectively support the first and second straight portions by the first and second straight rail support portions with longitudinal directions of the first and second rail support members respectively set to coincide with longitudinal directions of the first and second straight portions, the arc shaped rail support member is engaged with at least one of the first connecting portion and the second connecting portion to form a higher pair so as to rotate relative to the at least one connection portion about the first axis and to move relative to the at least one connection portion along a first straight line passing through the first axis and extending in the horizontal direction, the arc shaped rail support member is engaged with the first connecting portion to form a higher pair so as to rotate relative to the first connecting portion about a second axis extending in the vertical direction at the first connecting portion and to move relative to the first connecting portion along a second straight line passing through the second axis and extending in the horizontal direction, the arc shaped rail support member is engaged with the second connecting portion to form a higher pair so as to rotate relative to the second connecting portion about a third axis extending in the vertical direction at the second connecting portion and to move relative to the second connecting portion along a third straight line passing through the third axis and extending in the horizontal direction, the first axis exists in an intersection angle bisecting plane developing in the vertical direction and including an intersection angle bisector being a straight line passing through an intersection point between an extended line of the first straight portion and an extended line of the second straight line and extending in the horizontal direction while bisecting an intersection angle of the extended lines of the first and second straight portions, the arc shaped rail support member supports the arc shaped portion of the rail in the intersection angle bisecting plane, the first straight line extends in a direction of extension of the intersection angle bisector, the first rail support member and the second rail support member are symmetrical to each other with respect to the intersection angle bisecting plane, the second straight line extends in the horizontal direction intersecting with the intersection angle bisecting plane, and the third straight line and the second straight line are symmetrical to each other with respect to the intersection angle bisecting plane; and stretching the sheet using the clip chain type sheet stretching apparatus.

Advantageous Effects of Invention

According to the present invention, it is possible to provide a rail support device installed in a clip chain type sheet stretching apparatus configured to hold end portions in a transverse direction of a sheet by using clips of clip chains, and to stretch the sheet while conveying the sheet by running the clip chains in a horizontal direction along rails, the rail support device configured to support the rails, and having a simple configuration in which the rigidity of curved portions of the rails is enhanced.

Moreover, according to the present invention, it is possible to provide a sheet stretching method using a sheet stretching apparatus employing a rail support, device having a simple configuration in which the rigidity of curved portions of rails is enhanced.

BRIEF DESCRIPTION OF DRAWINGS

FIG. 1 is a view showing a schematic configuration of an entire film manufacturing system configured to stretch a plastic film and the like.

FIGS. 2(a) and 2(b) are views showing a schematic configuration of a tenter clip.

FIG. 3 is a plan view showing an outline of a film (sheet) transverse stretching machine according to a first embodiment.

[FIG. 4] FIGS. 4(a) and 4(b) are views showing a schematic configuration of a rail support device.

FIG. 5 is a plan view showing the rail support device in a state where a rail is partially bent.

[FIG. 6] FIGS. 6(a) and 6(b) are views showing a configuration for supporting the rail.

FIGS. 7(a) to 7(c) are views showing a schematic configuration of a rail connecting portion.

[FIG. 8] FIGS. 8(a) and 8(b) are views showing a schematic configuration of the rail connecting portion.

FIG. 9 is a view for explaining how an arc shaped portion of the rail supported by an arc shaped rail support member forms an ideal arc shape and is the view obtained by simplifying FIG. 5.

[FIG. 10] FIG. 10 is a view representing formulae which explain how the arc shaped portion of the rail supported by the arc shaped rail support member forms the ideal arc shape.

[FIG. 11] FIG. 11 is a view representing tables which explain how the arc shaped portion of the rail supported by the arc shaped rail support member forms the ideal arc shape.

[FIG. 12] FIG. 12 is a view representing formulae for obtaining appropriate relationships between a distance B and a distance A shown in FIG. 5 and the like.

[FIG. 13] FIG. 13 is a view representing table for obtaining appropriate relationships between a distance B and a distance A shown in FIG. 5 and the like.

[FIG. 14] FIG. 14 is a view representing formulae for finding a difference "R−P" between R and P when setting a value B/A equal to "0.5".

[FIG. 15] FIGS. 15(a) and 15(b) are views representing formulae for finding a difference "R−P" between R and P when setting a value B/A equal to "0.5".

FIG. 16 is a plan view showing an outline of a clip chain type sheet stretching apparatus according to a second embodiment.

FIG. 17 is a view obtained by simplifying a rail support device and is the view corresponding to FIG. 9.

[FIG. 18] FIG. 18 is a view for explaining how an arc shaped portion of an offset rail supported by an arc shaped rail support member forms an ideal arc shape.

FIG. 19 is a plan view showing a schematic configuration of a clip chain type sheet stretching apparatus according to a third embodiment of the present invention.

FIG. 20 is a view showing a detailed structure of the clip chain type sheet stretching apparatus.

FIG. 21 is a view showing a detailed structure of the clip chain type sheet stretching apparatus.

FIG. 22 is a view showing a detailed structure of the clip chain type sheet stretching apparatus.

FIG. 23 is a view showing a detailed structure of the clip chain type sheet stretching apparatus.

FIG. 24 is a plan view showing a rail support device according to a modified example and is the view corresponding to FIG. 4(a).

FIG. 25 is a view obtained by simplifying FIG. 24 and is the view corresponding to FIG. 5 and FIG. 17.

[FIG. 26] FIG. 26 is a view representing formulae which explain how the arc shaped portion of the rail supported by the arc shaped rail support member forms the ideal arc shape.

[FIG. 27] FIG. 27 is a view representing formulae which explain how the arc shaped portion of the rail supported by the arc shaped rail support member forms the ideal arc shape.

[FIG. 28] FIG. 28 is a view representing formulae for obtain an error.

[FIG. 29] FIGS. 29(a) to 29(c) are views representing tables of obtained errors.

[FIG. 30] FIG. 30 is a view representing formulae for obtain an error.

[FIG. 31] FIGS. 31(a) and 31(b) are views representing tables of obtained errors.

DESCRIPTION OF EMBODIMENTS

Figure 1:
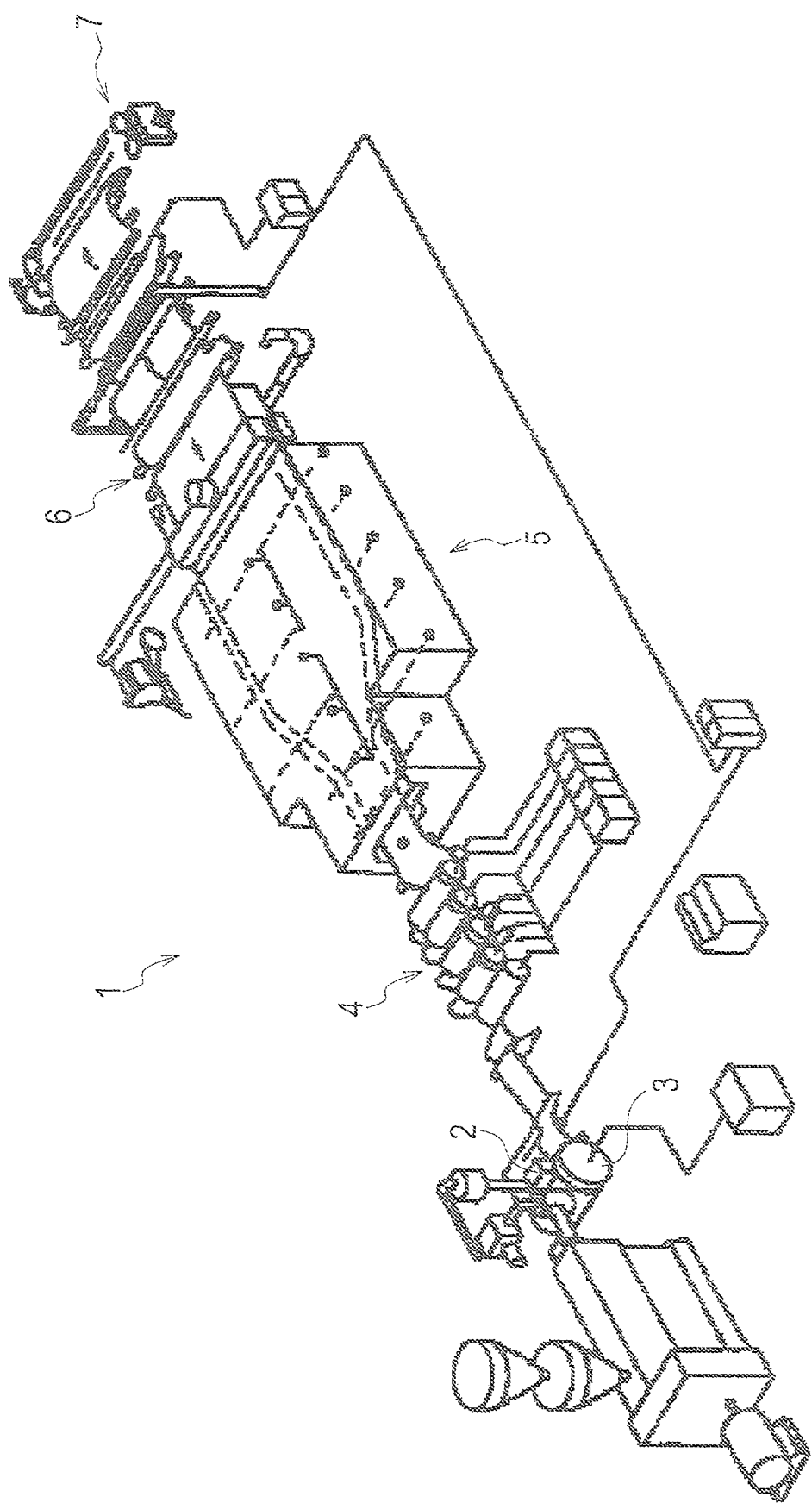
[FIG. 1]

Embodiments of the present invention will be described below in detail with reference to the accompanying drawings.
(First Embodiment)
FIG. 1 is a view showing a schematic configuration of an entire film manufacturing system 1 configured to stretch a plastic film and the like, As shown in Japanese Unexamined Patent Application Publication No. Hei 10-337773, for example, the film manufacturing system 1 is provided with various devices including a T die 2, a cast roll 3, a longitudinal stretching machine 4, a transverse stretching machine 5, a drawing unit 6, a winder 7, and the like. Melted resin injected from the T die 2 is formed into a sheet shape by the cast roll 3 and thus, an original sheet is formed. Moreover, this original sheet is longitudinally stretched by the longitudinal stretching machine 4 and then transversely stretched by the transverse stretching machine 5, and is rolled up by the winder 7 via the drawing unit 6.

Figure 2:
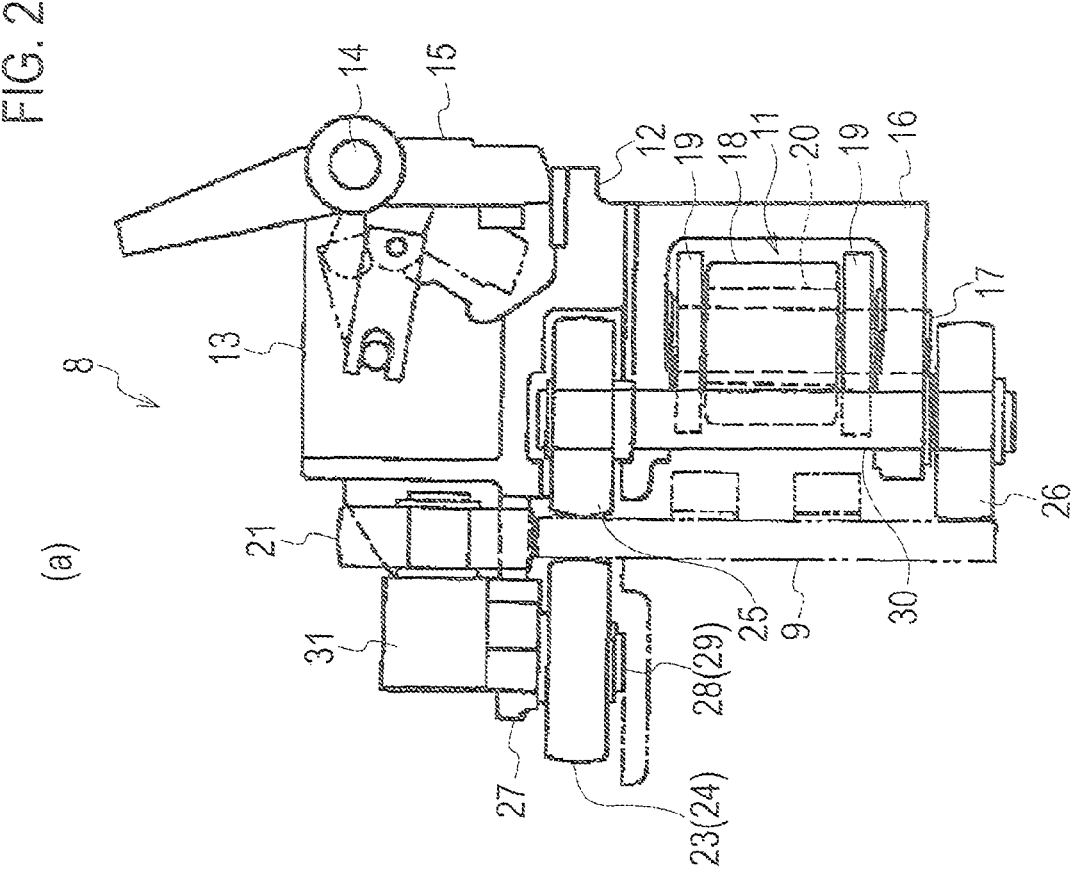
[FIG. 2]
Figure 3:
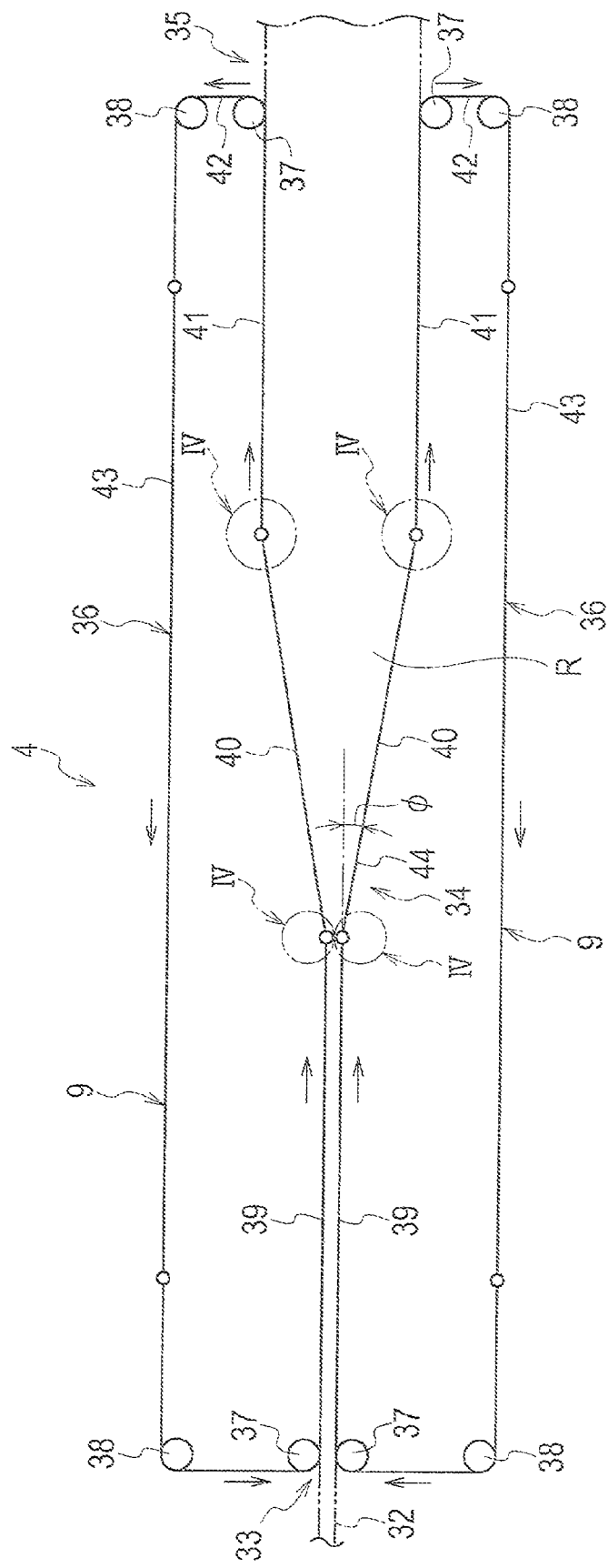
[FIG. 3]

The film (sheet) transverse stretching machine 5 is provided with tenter clips 8 shown in FIGS. 2(a) and 2(b) configured to respectively clip both sides of the sheet and to stretch the sheet in a transverse direction, and two rows of guide rails 9 on right and left sides shown in FIG. 3 configured to guide running motion of the tenter clips 8.

The tenter clip 8 is provided with a clip body 10 configured to clip the sheet and a drive chain 11. The clip body 10 includes a right and left pair of lever support bodies 13 provided in a protruding manner above a clip base 12 as shown in FIG. 2(a).

A spindle 14 is disposed between the pair of lever support bodies 13. A clip lever 15 is axially supported by the spindle 14 in a rotatable manner. The clip lever 15 is configured to clip the sheet in a clipping position shown in FIG. 2(a) and to release clipping of the film while rotating clockwise about the spindle 14 in FIG. 2(a).

A chain box 16 of the drive chain 11 is located below the clip base 12. Upper and lower end portions of a connecting pin 17 are respectively fixed to upper and lower wall surfaces of the chain box 16.

A roller 18 and upper and lower link plates 19 for the roller 18 are disposed inside the chain box 16. The two link plates 19 are connected to each other by a cylindrical bushing 20. The connecting pin 17 is inserted to the bushing 20. In this way, the chain box 16 is connected to the link plates 19 by use of the connecting pin 17, and thus an endless chain is formed.

The clip body 10 is provided with multiple bearings 21 to 26. As shown in FIG. 2(a), the clip base 12 is provided with a bearing support body 27 extending on an opposite side of the clip lever 15. Upper end portions of respective spindles 28 and 29 of the two bearings 23 and 24 are fixed to the bearing support body 27. Moreover, the bearing 23 is axially supported by a lower end portion of one spindle 28 in a rotatable manner while the bearing 24 is axially supported by a lower end portion of the other spindle 29 in a rotatable manner.

A spindle 30 for the other two bearings 25 and 26 is fitted vertically in the clip base 12 as shown in FIG. 2(a). The upper bearing 25 and the lower bearing 26 are respectively axially supported by an upper and a lower ends of the spindle 30 in a rotatable manner.

A spindle 31 for the bearing 21 is fixed onto the bearing support body 27. The bearing 21 is axially supported by one end of the spindle 31 in a rotatable manner.

As shown in FIG. 3, a film conveyance path R inside the transverse stretching machine 5 includes a film accepting portion 33 configured to accept a film 32 longitudinally stretched by the longitudinal stretching machine 4, a transverse stretching portion 34 configured to transversely stretch the film 32, and a film exit portion 35 configured to send the transversely stretched film 32, toward the drawing unit 6.

A right and left pair of tenter clip tracks 36 are respectively disposed on both sides of the film conveyance path R. Idler sprockets 37 and drive sprockets 38 of the drive chain 11 for the tenter clips 8 are disposed on the tenter clip tracks 36. The idler sprockets 37 and the drive sprockets 38 of the drive chain 11 are disposed at the film accepting portion 33 and the film exit portion 35 in the transverse stretching machine 5.

The long guide rails 9 on the right and left of the respective tenter clips 8 in the transverse stretching machine 5 are formed with multiple rail components serially connected to one another along a running direction of the film. Specifically, each of the right and left guide rails 9 includes an entrance side straight guide portion 39 connecting between the idler sprocket 37 at the film accepting portion 33 and the transverse stretching portion 34, a transverse stretching guide portion 40 disposed at the transverse stretching portion 34, an exit side straight guide portion 41 connecting between the transverse stretching portion 34 and the idler sprocket 37 at the film exit portion 35, an expanding-contracting portion 42 disposed between the idler sprocket 37 and the drive sprocket 38 at the film exit portion 35 and configured to adjust an entire length of the guide rail 9 through expansion and contraction, and a returning guide portion 43 connecting between the drive sprocket 38 at the film exit portion 35 and the drive sprocket 38 as well as the idler sprocket 37 at the film accepting portion 33. A spreading portion 44 having a stretch angle φ and being configured to gradually spread a clearance between the right and left guide rails 9 along the running direction of the film 32 as shown in FIG. 3 is formed at the transverse stretching guide portion 40.

The film transverse stretching machine (the clip chain type sheet stretching apparatus; the clip chain type sheet-film stretching apparatus) 4 will be described further.

The clip chain type sheet stretching apparatus 4 is a device configured to hold end portions in the transverse direction of the sheet 32 by using the clips 8 of the clip chains endlessly (annularly) formed by connecting numerous clips (tenter clips) 8 for holding the end portions in the transverse direction of the sheet 32, to run the clip chains in a horizontal direction, for example (either straight or in a curved shape such as an arc shape within a horizontal plane, for example) along the rails (the guide rails) 9, and to stretch the sheet 32 in the horizontally transverse direction of the sheet while conveying the sheet 32 in the longitudinal direction of the sheet 32 which substantially coincides with the running direction of the clip chains.

The clip chain type sheet stretching apparatus 4 is provided with rail support devices 51 configured to support the rails 9. The rail support devices 51 are the devices for supporting the rails 9 in positions of bent portions of the rails 9 as indicated with a reference numeral IV in FIG. 3 and peripheral portions of the bent portion.

FIGS. 4(*a*) and 4(*b*) are views showing a schematic configuration of the rail support device 51. FIG. 4(*a*) is a plan view of the rail support device 51 and FIG. 4(*b*) is a view along an arrow IVB in FIG. 4(*a*). In FIG. 4(*b*), some of components of the rail support device 51 are illustrated with cross sections in order to facilitate the understanding.

Figure 5:
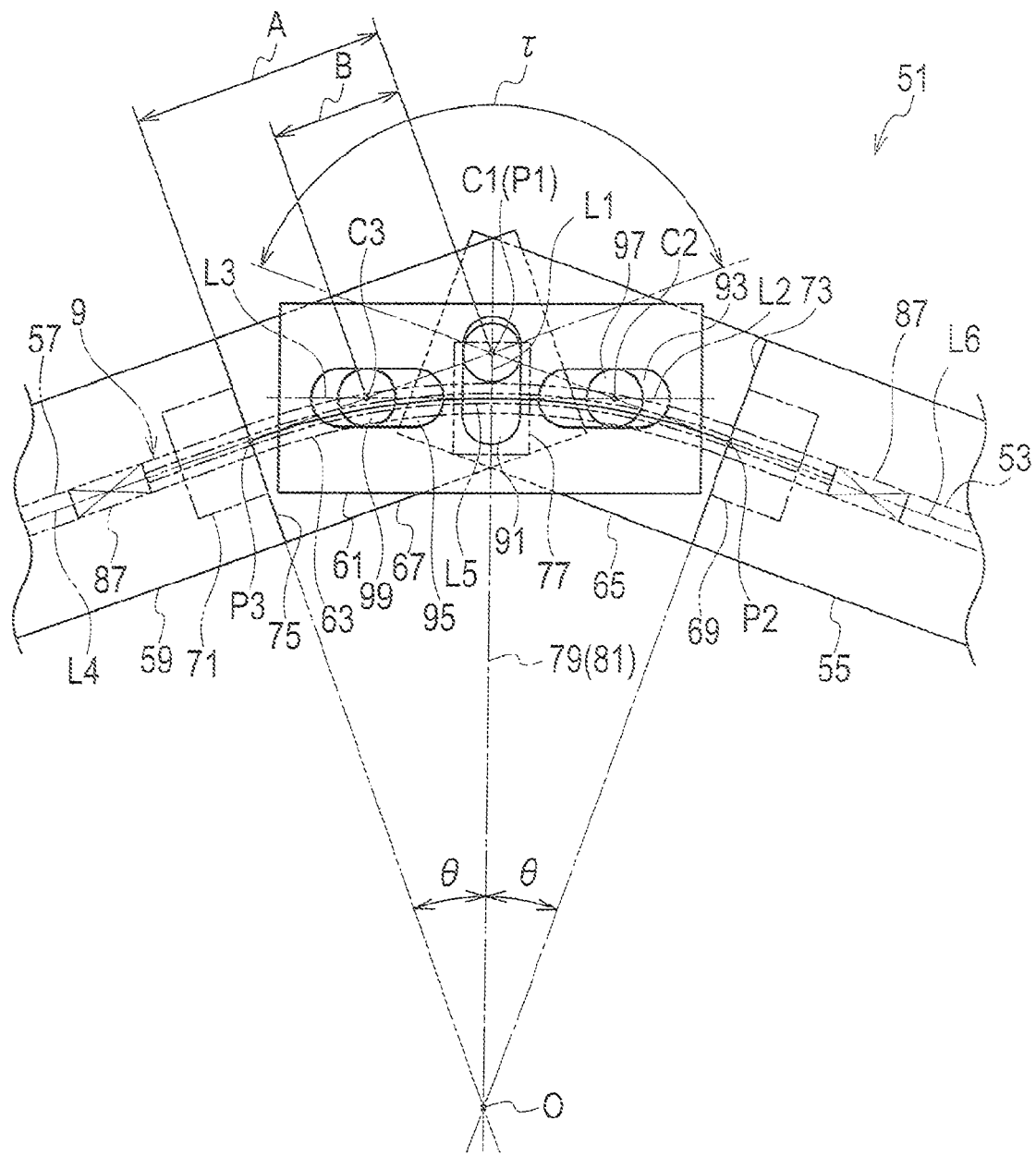
[FIG. 5]

FIG. 5 is a plan view showing the rail support device 51 in a state where the rail 9 is partially bent.

The rail support device 51 includes a first rail support member 55 configured to support a first straight portion 53 of the rail 9 extending in the horizontal direction, a second rail support member 59 configured to support a second straight portion 57 of the rail 9 extending in the horizontal direction and in a direction intersecting the first straight portion 53, and an arc shaped rail support member 61.

The arc shaped rail support member 61 is a member configured to support an arc shaped portion 63 of the rail 9 in order to smoothly run the clip chains. The arc shaped portion 63 is a portion of the rail 9 extending in the horizontal direction configured to connect the straight portions 53 and 57 of the rail 9 to each other. The arc shaped portion 63 is formed flexibly so as to have variable a curvature radius.

A connecting portion 65 provided on one end portion side in the longitudinal direction of the first rail support member 55 is engaged with a connecting portion 67 provided on one end portion side in the longitudinal direction of the second rail support member 59. The second rail support member 59 is configured to rotate relatively to the first rail support member 55 about a first axis C1 that extends in a vertical direction at the connecting portions 66 and 67.

The rail support members 55 and 59 support the respective straight portions 53 and 57 of the rail 9 by using straight rail supporting portions 69 and 71 being portions other than the connecting portions 65 and 67 (portions of the rail support members 55 and 59 extending long on other end portion sides in the longitudinal directions) so as to align the longitudinal directions of the rail support members 55 and 59 respectively with the longitudinal directions of the straight portions 53 and 57.

Specifically, the first rail support member 55 supports the first straight portion 53 of the rail 9 by use of the straight rail supporting portion 69 located on the opposite side of the second rail support member 59 such that the longitudinal direction of the first rail support member 55 and the longitudinal direction of the first straight portion 53 of the rail 9 coincide with each other. Similarly, the second rail support member 59 supports the second straight portion 57 of the rail 9 in a similar manner.

The straight rail supporting portions 69 and 71 support the straight portions 53 and 57 of the rail 9 at boundaries 73 and 75 with the connecting portions 65 and 67 in the longitudinal directions of the rail support members 55 and 59. For example, the straight rail supporting portion 69 of the first rail support member 55 supports the first straight portion 53 of the rail 9 at the boundary 73 with the connecting portion 65 in the longitudinal direction of the first rail support member 55. Similarly, the straight rail supporting portion 71 of the second rail support member 59 supports the second straight portion 57 of the rail 9 at the boundary 75 with the connecting portion 67 in the longitudinal direction of the second rail support member 59.

The arc shaped rail support member 61 is provided at the connecting portions 65 and 67 and provided on the inner side of the connecting portions 65 and 67 in a plan view (see FIG. 4(*a*) and FIG. 5). Specifically, the arc shaped rail support member 61 is in the connecting portions 65 and 67 in the plan view.

The arc shaped rail support member 61 is engaged with at least one of the connecting portion 65 of the first rail support member 55 and the connecting portion 67 of the second rail support portion 59 to form a higher pair. Specifically, the arc shaped rail support member 61 is disposed to be rotatable with respect to at least one of the connecting portion 65 of the first rail support member 55 and the connecting portion 67 of the second rail support portion 59 about the first axis C1. Further, the arc shaped rail support member 61 is disposed to be relatively movable with respect to at least one of the connecting portion 65 of the first rail support member 55 and the connecting portion 67 of the second rail support portion 59 along a first straight line L1 which passes through, the first axis C1 and extends in a certain horizontal direction.

The arc shaped rail support member 61 is engaged with the connecting portion 65 of the first rail support member 55 to form a higher pair. Specifically, the arc shaped rail support member 61 is disposed to be rotatable with respect to the connecting portion 65 of the first rail support member 55 about a second axis C2 extending in a vertical direction. The second axis C2 is provided between the first axis C1 and the straight, rail support portion 69 of the first rail support member 55 on the connecting portion 65 of the first rail support member 55. Further, the arc shaped rail support member 61 is disposed to be relatively movable with respect to the connecting portion 65 of the first rail support member 55 along a second straight line L2 which passes through the second axis C2 and extends in a certain horizontal direction.

The arc shaped rail support member 61 is engaged with the connecting portion 67 of the second rail support member 59 to form a higher pair. Specifically, the arc shaped rail support member 61 is disposed to be rotatable with respect to the connecting portion 67 of the second rail support member 59 about a third axis C3 extending in a vertical direction. The third axis C3 is provided between the first axis C1 and the straight rail support portion 71 of the second rail support member 59 on the connecting portion 67 of the second rail support member 59. Further, the arc shaped rail support member 61 is disposed to be relatively movable with respect to the connecting portion 67 of the second rail support member 59 along a third straight line 13 which passes through the third axis C3 and extends in a certain horizontal direction.

The arc shaped rail support member 61 includes a rail support portion (a rail holding portion) 77 configured to support the arc shaped portion 63 of the rail 9 at a central portion in the longitudinal direction of the arc shaped portion 63.

The first axis C1 is present in an intersection angle bisecting plane 79 and the arc shaped rail support member 61 supports the arc shaped portion 63 of the rail 9 in a predetermined position in the intersection angle bisecting plane 79 by engaging the rail support portion 77 with the arc shaped portion 63 of the rail 9. The first straight line L1 extends in a direction in which an intersection angle bisector 81 extends. Specifically, the first straight line L1 coincides with the intersection angle bisector 81 in a plan view.

The intersection angle bisector 81 is a straight line Which passes through an intersecting point P1 between an extended line of the first straight portion 53 of the rail 9 supported by the first rail support member 55 and an extended line of the second straight portion 57 of the rail 9 supported by the second rail support member 59. The intersection angle bisector 81 extends in the horizontal direction while bisecting an intersection angle τ (see FIG. 5, for example) of the extended lines. Meanwhile, the intersection angle bisecting plane 79 is a plane developing in a vertical direction while including the intersection angle bisector 81.

The rail support device 51 is formed substantially symmetrically with respect to the intersection angle bisecting plane 79. Specifically, the first rail support member 55 and the second rail support member 59 are symmetrical with respect to the intersection angle bisecting plane 79. To be more precise, with respect to the intersection angle bisecting plane 79, the second axis C2 and the third axis C3 are symmetrically located, the connecting portions 65 and 67 are substantially symmetrical, the straight rail support portions 69 and 71 are symmetrical, the straight portions 53 and 57 of the rail 9 are symmetrical, and the arc shaped portion 63 of the rail 9 is symmetrical.

The second straight line L2 extends in the horizontal direction to intersect with the intersection angle bisector 79 at a predetermined angle (in an orthogonal direction to the intersection angle bisecting plane 79, for example), and the third straight light L3 and the second straight line L2 are symmetrical with respect to the intersection angle bisecting plane 79.

As described previously, the arc shaped rail support member 61 supports the arc shaped portion 63 of the rail 9 in the position of the rail support portion 77 while the first rail support member 55 (or the second rail support member 59) supports the first straight portion 53 (or the second straight portion 57) in the position of the straight rail support portion 69 (or the straight rail support portion 71) (at each of the boundaries 73 and 75 described above). These supporting structures will be described with reference to FIGS. 6(a) and 6(b) (views showing the supporting structure of the rail 9).

The rail support portion 77 of the arc shaped rail support member 61 supports the rail 9 by holding the arc shaped portion 63 of the rail 9 between a pair of protrusions 83 (83A and 83B) formed either into a semispherical shape or a semicylindrical shape, for example. Peaks of the protrusions 83 contact the rail 9.

The first rail support member 55 (or the second rail support member 59) also supports the rail 9 similarly by holding the straight portion 53 (57) of the rail 9 between a pair of protrusions 85 (85A and 85B) formed either into a semispherical shape or a semicylindrical shape, for example. Peaks of the protrusions 85 contact the rail 9. The peaks of the protrusions 85 are located at the boundary 73 (75) in the longitudinal direction of the first rail support member 55 (or the second rail support member 59).

Most parts of the straight portions 53 and 57 of the rail 9 are formed by stacking a smaller number about three pieces of relatively thick plate members in a thickness direction thereof. In this way, the most parts of the straight portions 53 and 57 of the rail 9 possess high rigidity.

In the meantime, the arc shaped portion 63 of the rail 9 and partial portions of the straight portions 53 and 57 of the rail 9 are formed by stacking multiple pieces of thin plate members in a thickness direction thereof. In this way, the arc shaped portion 63 of the rail 9 is formed flexibly so as to be elastically deformable into an arc shape as shown in FIG. 5.

More specifically, as understood from FIGS. 4(a) and 4(b), a portion of the rail 9 formed by stacking multiple thin plate members includes the arc shaped portion 63 and the partial portions of the straight portions 53 and 57 adjacent to the arc shaped portion 63.

Rail connecting portions 87 are provided between the portion of the rail 9 formed by stacking multiples pieces of the thin plate members and the straight portions 53 and 57 possessing high rigidity. The rail connecting portions 87 are provided in order to absorb the change in overlapping lengths between the portion of the rail 9 formed by stacking multiples pieces of the thin plate members and the straight portions 53 and 57 possessing high rigidity, which are generated at the time of changing the intersection angle τ shown in FIG. 5.

The rail connecting portions 87 and the like will be described in detail by using FIGS. 7(a) to 7(c) and FIGS. 8(a) and 8(b).

As disclosed in Japanese Unexamined Patent Application Publication No. 2007-230143, for example, and as described previously, the rail 9 is formed of a laminated body (a steel plate rail) 538 (laminated bodies 540 and 542) in which multiple steel plates (metal plates) are provided one on top of the other and stacked. Further, as shown in FIGS. 7(a) to 7(c), the laminated body 538 is provided with seam portions 539 configured to split the rail in a front-back direction along the running direction of the clips 8.

Figure 7:
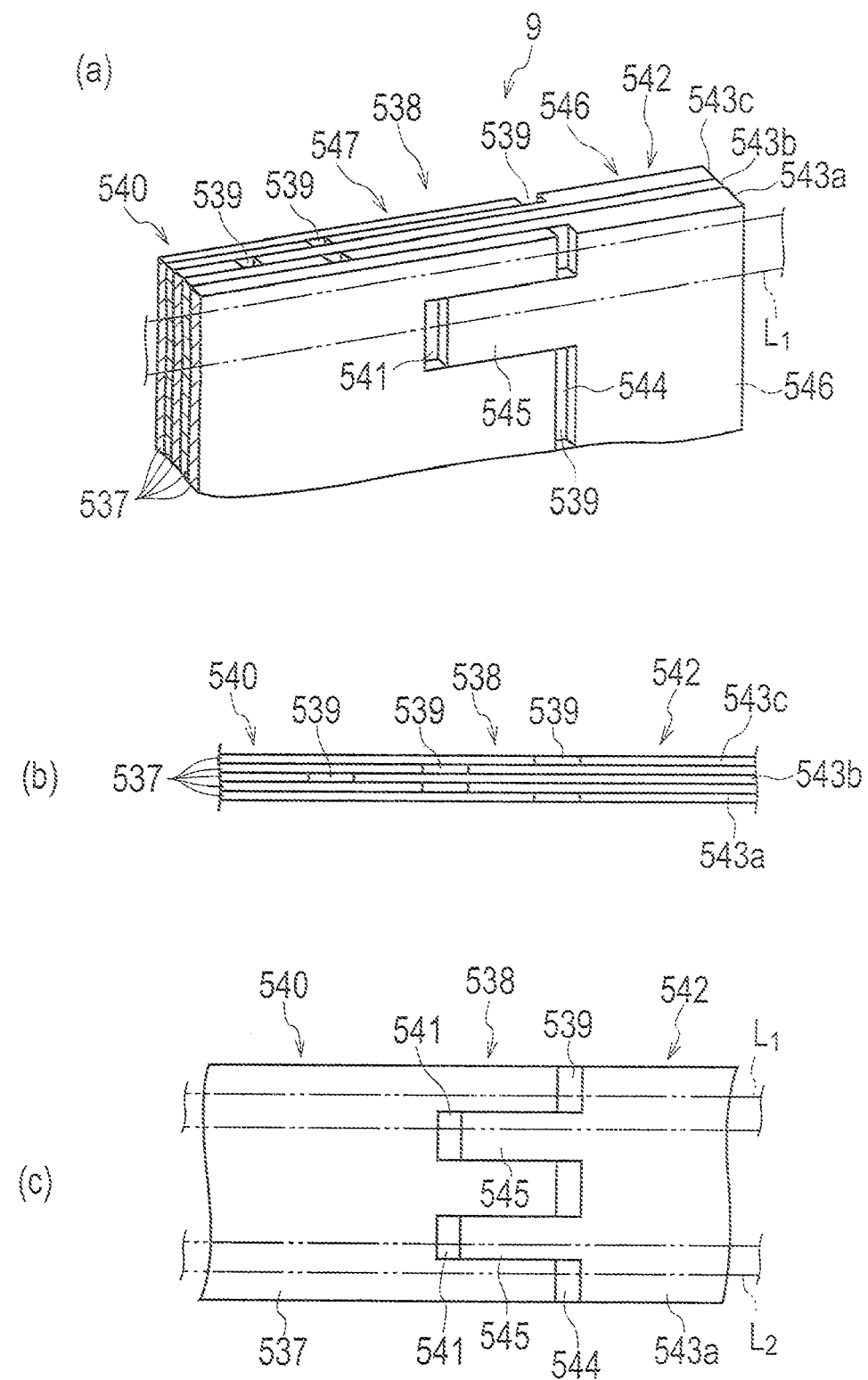
[FIG. 7]

The laminated body 540 located on one side (on the left side in FIGS. 7(a) to 7(c)) of the seam portions 539 along the running direction of the clips 8 is made of a steel stacked portion formed by stacking five steel plates 537. In this way, the arc shaped portion 63 of the rail 9 and the partial portions of the straight portions 53 and 57 of the rail 9 are formed.

In this embodiment, the laminated body 542 located on the other side of the seam portions 539 is made of a steel plate stacked portion formed by stacking three steel plates 543a, 543b, and 543c as shown in FIGS. 7(a) and 7(b).

As shown in FIG. 8, a cutout portion 544 having a shape corresponding to a shape of an end edge portion of the steel plate 537 on an outer surface side of the laminated body 540 is formed on an outer surface side of each of the steel plates 543a and 543c. An engaging protrusion 545 to be movably inserted into a guiding recess 541 on the laminated body 540 in the running direction of the clips 8 is integrally formed in a protruding manner on an outer surface side of the cutout portion 544. Moreover, the two steel plates 543a and 543c on outer sides of the steel plate 543b are each made of integrated structure 546 in which the engaging protrusion 545 is integrally provided on the outer surface side of the cutout portion 544 in a protruding manner.

The roller 21 and the like of each clip 8 is disposed to be on a lapped portion between the guiding concave portion 541 of the upstream laminated body 540 and engaging convex portion 545 of the downstream laminated body 540 at the seam portions on both side surfaces of the rail 9. Here, reference numerals $L_1$ and $L_2$ in FIG. 7(c) each indicate running tracks of the roller 21 and the like.

The seam portions 539 are arranged on an upper surface of the rail 9 with the positions displaced along the running direction of the clips 8 for the multiple steel plates 537 constituting the laminated body 538. In this way, it is possible to support a roller for accepting the own weight of the clip 8 in a state of contacting at least one of the steel plates 537 of the limited body 538 at any time. Moreover, it is also possible to absorb expansion and contraction due to bending of the rail 9 and further to adjust and change a curvature radius of a curved portion of the rail 9 easily.

As described previously, the straight rail support portions 69 and 71 hold the straight portions 53 and 57 of the rail at the boundary portions, which are positions of the boundaries 73 and 75 between the connecting portions 65 and 67 of the rail support members 55 and 59 and the other end portions of the rail support members 55 and 59 in the longitudinal direction of the rail support members 55 and 59.

Specifically, as shown FIG. 6(b), the first straight rail support portion 69 holds the first straight portion 53 of the rail 9 at the boundary portion, which is in the position at the boundary 73 between the connecting portion 65 of the first rail support member 55 and the other end portion of the first rail support member 55 in the longitudinal direction of the first rail support member 55. Similarly, the second straight rail support portion 71 holds the second straight portion 57 of the rail 9 at the boundary portion, which is in the position at the boundary 75 between the connecting portion 67 of the second rail support member 59 and the other end portion of the second rail support member 59 in the longitudinal direction of the second rail support member 59.

As shown in FIG. 5 and the like, a distance B between the intersection angle bisecting plane 79 and the second axis. C2 (or the third axis C3) in the longitudinal directions of the rail support members 55 and 59 is 0.50 to 0.59 times as long as a distance A between the intersection angle bisecting plane 79 and the boundary portion (the boundary 73 or 75). It is more preferable to set the distance B 0.50 times as long as the distance A.

In the rail support device 51, the straight rail 9 passes through the first axis C1 when the intersection angle τ between the first straight portion 53 of the rail 9 and the second straight portion 57 of the rail 9 is equal to 180° as shown in FIG. 4(*a*) (when the first straight portion 53 of the rail 9 and the second straight portion 57 of the rail 9 are located on a single straight line).

Here, the rail support device 51 will be described further in detail.

The first rail support member 55 and the second rail support member 59 are rotatable about the first axis C1 by using a columnar first shaft member 89.

Specifically, the first shaft member 89 is integrally provided in the vicinity of one end portion of the connecting portion 65 of the first rail support member. Meanwhile, a through hole is provided in the vicinity of one end portion of the connecting portion 67 of the second rail support member. As this through hole is engaged with the first shaft member 89, the second rail support member 59 is relatively rotated with respect to the first rail support member 55.

As shown in FIG. 4(*a*), the arc shaped rail support member 61 includes a first elongated hole (a through hole) 91, a second elongated hole (a through hole) 93, and a third elongated hole (a through hole) 95. Moreover, as the first elongated hole 91 is engaged with the first shaft member 89, the arc shaped rail support member 61 is relatively rotated about the first axis C1 and relatively moved along the first straight line L1 with respect to the connecting portions 65 and 67.

A columnar second shaft member 97 is integrally provided on the connecting portion 65 of the first rail support member 55. Moreover, as the second elongated hole 93 is engaged with the second shaft member 97, the arc shaped rail support member 61 is relatively rotated, about the second axis C2 and, relatively moved along the second straight line L2 with respect to the connecting portion 65.

Similarly, a columnar third shaft member 99 is integrally provided on the connecting portion 67 of the second rail support member 59. Moreover, as the third elongated hole 95 is engaged with the third shaft member 99, the arc shaped rail support member 61 is relatively rotated about the third axis C3 and relatively moved along the third straight line L3 with respect to the connecting portion 67.

As described above, a constrained chain is formed by the rail support members 55, 59, and 61 as the rail support members 55, 59, and 61 are engaged with one another. Thus, the arc shaped rail support member 61 performs a constrained motion in response the change in a bending angle (the intersection angle) τ between the rail support members 55 and 59 so as to uniquely determine a position and posture of the arc shaped rail support member 61. Moreover, it is possible to retain the arc shaped portion 63 of the flexible rail 9 into an ideal arc shape.

How the arc shaped portion 63 of the rail 9 supported by the arc shaped rail support member 61 is formed into the ideal arc shape will be described by using formulae shown in FIG. 9, FIG. 10 and so forth and tables shown in FIG. 11 and so forth.

Figure 9:
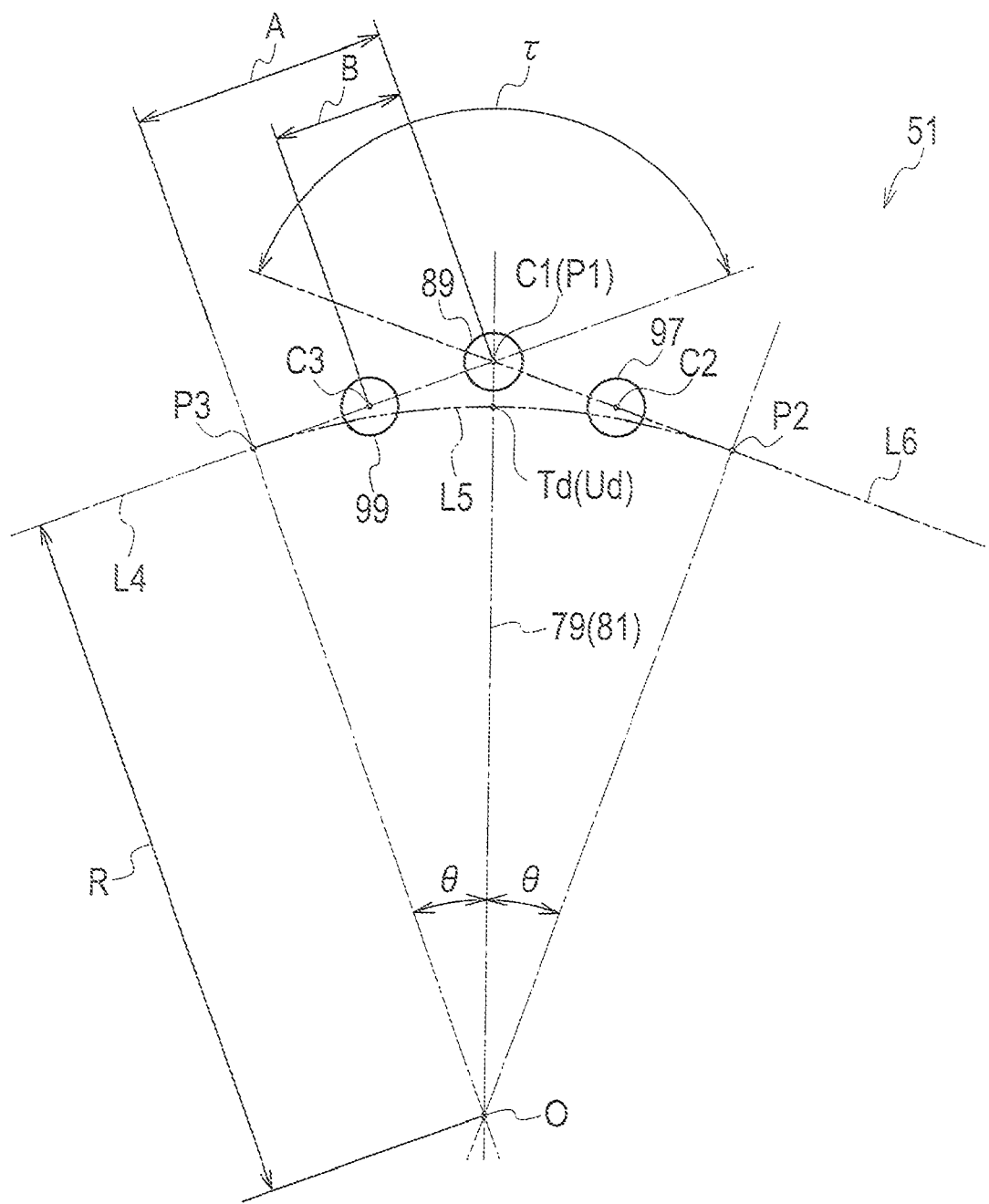
[FIG. 9]

FIG. 9 is a simplified view of FIG. 5. In the following description, only the left side of FIG. 9 will be, explained because FIG. 9 shows a symmetrical figure with respect to the plane 79 (the straight line 81).

A point O in FIG. 9 is a center of the arc shaped portion 63 of the rail 9. A point P4 is a point P4 in FIG. 6(*a*). A point P2 is a point P2 in FIG. 6(*b*). A point P3 is a point P3 in FIG. 6(*b*). A triangle O-P3-C1 is a right triangle in which a relationship between the intersection angle τ and an angle θ is expressed by "θ=90°−τ/2". Straight lines L9 and L6 are center lines of the respective straight portions 53 and 57 of the rail 9 while an arc shaped curved line L5 is a center line of the arc shaped portion 63 when the arc shaped portion 63 of the rail 9 is formed into the ideal arc.

Here, an intersection point between the intersection angle bisector 81 and the curved line L5 is defined as Td. Meanwhile, the center of the arc shaped portion 63 of the rail 9 in the rail support portion 77 will be defined as a point Ud. Here, as already understood, the point Ud and the above-described point P4 coincide with each other. Meanwhile, in a state where the arc shaped rail support member 61 is disposed at the connecting portions 65 and 67, the point Ud is located in a midpoint of a line segment which connects the second axis C2 and the third axis C3 to each other. Further, the point Ud is an actual midpoint of the arc shaped portion 63 of the rail 9 when the arc shaped portion 63 of the rail 9 is supported by the rail support portion 77 of the arc shaped rail, support member 61.

Therefore, when the point Td and the point Ud coincide with each other, the arc shaped portion 63 of the rail 9 forms the ideal arch shape. Meanwhile, even when the point Td is slightly displaced from the point Ud; the arc shaped portion 63 of the rail 9 forms an almost ideal shape. The point Td and the point Ud are slightly displaced from each other on the rail intersection angle bisector 81. However, FIG. 9 illustrates these points as being coincided with each other as the displacement is minimal.

Formulae f101, f102, f103, and f104, shown in FIG. 10, can be obtained from FIG. 9. Here, "R" in the formula f101 and the like denotes a length of a line segment O-P3 (P2) (a length of a line segment O-Td) in FIG. 9, which is the curvature radius of the arc shaped portion 63 of the rail 9.

In the formulae f103 and f104, lengths of C1-Td (which is simply expressed as "Td" in FIG. 11) and lengths of C1-Ud (which is simply expressed as "Ud" in FIG. 11) are obtained by changing the value of the angle θ. Moreover, change ratios of Td and change ratios of Ud are obtained. Results are shown on a table in FIG. 11.

Here, the rail support device 51 of the clip chain type sheet stretching apparatus 4 is used while setting the intersection angle τ in a range from 180° to 90°. Therefore, the rail support device 51 is used while setting the angle θ in a range from 0° to 45°. Moreover, referring to FIG. 11, it is understood that a relationship of Td1/Td2≈Ud1/Ud2 holds true when the angle θ in the range from 0° to 45°. Note that Td2 is Td in an applicable box in FIG. 2 and Td1 is Td in a box immediately above the applicable box. The same applies to Ud2 and Ud1.

Here, assuming that B=A/2, then Td≈Ud (the length of the line segment C1-Td≈the length of the line segment C1-Ud, and the length of the line segment O-Td≈the length of the line segment O-Ud) holds true. Therefore, the rail 9 is formed substantially into the arc shape at the arc shaped portion 63 when the rail 9 is supported as shown in FIG. 4 to FIG. 6 and the like.

Although B=A/2 is assumed in the above description, it is also possible to change the relationship between the distance B and the distance A as appropriate.

Specifically, when finding a, ratio between the distance B and the distance A for P=R in formulae f121 and f122 in FIG. 12 derived from FIG. 9, a table as shown in FIG. 13 can be derived from formulae f123, f124, and f125 shown in FIG. 12. Here, "P" and "R" in the formulae respectively denote the length of the line segment O-Ud and the length of the line segment O-Td as described previously.

Referring to FIG. 13, it is understood that the value B/A only needs to be in a range from 0.5 to 0.59 in order to achieve R≈P.

Next, formulae f141, f142, f143, and f144 shown in FIG. 14 are derived when obtaining a difference "R−P" between R and P in the case where the value B/A is set to "0.5". Here, in the formula 144, the "R−P" is divided by "A" to be dimensionless.

A table shown in FIG. 15(*a*) can be obtained when a value "(R−P)/A" is found by substituting the value of the angle θ into the formula f114. FIG. 15(*b*) shows values "R", "P", "R−P", and "(R−P)/A" obtained when setting A=150 mm and B=75 mm in order to facilitate the understanding. As understood from FIG. 15(*b*), when the value B/A is set to "0.5", the rail 9 is formed substantially into the arc shape at the arc shaped portion 63 as long as the angle θ is in the range from 0° to 45°.

According to the rail support device 51, the arc shaped rail support member 61 is engaged with the connecting portions 65 and 67 of the respective, rail support members 55 and 59 to form a higher pair. Further, the arc shaped rail support member 61 and the like are disposed symmetrically with respect to the intersection angle bisecting plane 79. Hence with the simple configuration, a central portion in the longitudinal direction of the arc shaped portion 63 in the rail 9 can be held by the arc shaped rail support member 61 as described above, and the shape of the arc shaped portion 63 of the rail 9 can be maintained as the substantially ideal arc shape while enhancing rigidity of the arc shaped portion 63 of the rail 9.

According to the rail support device 51, the arc shaped rail support member 61 is provided inside the connecting portions 65 and 67 in the plan view. Hence it is possible to prevent the arc shaped rail support member 61 from protruding out of the rail support members 55 and 59.

According to the rail support device 51, the distance B between the intersection angle bisecting plane 79 and the second axis C2 (or the third axis C3) is 0.50 to 0.59 times as long as the distance A between the intersection angle bisecting plane 79 and the boundary 73 (75). Hence it is possible to maintain the shape of the arc shape portion 63 of the rail 9 in more ideal arc shape.

In the rail support device 51, a fraction is less likely to be generated in terms of dimensions by setting the distance B 0.50 times as long as the distance A. Hence it is easy to design and manufacture the tail support device 51.

According to the rail support, device 51, the contacting portions 65 and 67 of the respective, rail Support members 55 and 59 and the arc shaped rail support member 61 form the higher pair by using the shaft members 89, 97, and 99 provided on the rail support members 55 and 59 as well as the elongated holes 91, 93, and 95 provided on the arc shaped rail support member 61. Hence the configuration of the device is further simplified.

(Second Embodiment)

A rail support device 51*a* according to a second embodiment is different from the rail support device 51 according to the first embodiment in that the device 51*a* supports rails 9 (9A and 9B) which extend in parallel with each other. Other features are substantially similar to those of the rail support device 51 according to the first embodiment, and substantially similar effects are exerted.

The rail support device 51*a* according to the second embodiment is applied to a clip chain, type sheet stretching apparatus disclosed in Japanese Unexamined Patent Application Publication No. 2005-169856, for example.

Figure 16:
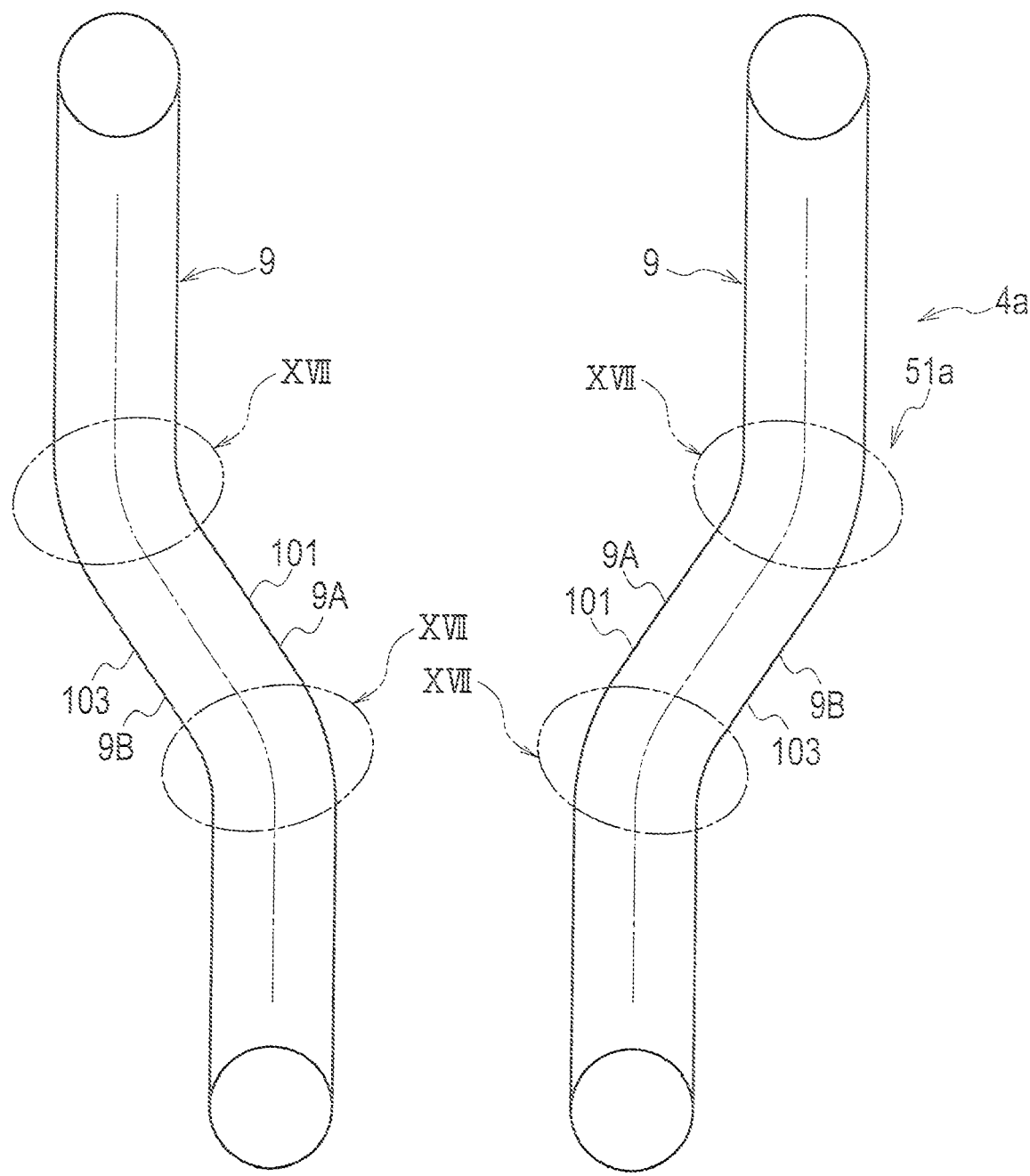
[FIG. 16]

A right and left pair of rails are not symmetrically disposed in the clip chain type sheet stretching apparatus 4*a* disclosed in Japanese Unexamined. Patent Application Publication No. 2005-169856. However, in the clip chain type sheet stretching apparatus 4*a* according to the second embodiment, a right and left pair of rails 9 are assumed to be symmetrically disposed as shown in FIG. 16. In the clip chain type sheet stretching apparatus 4*a*, the right and left pair of rails 9 may be asymmetrically disposed as shown in Japanese Unexamined Patent Application Publication No. 2005-169856.

In one of rails 9A out of the pair of rails 9 of the clip chain type sheet stretching apparatus 4*a*, a sheet holding conveying side portion 101 and a returning side portion 103 extend in parallel with each other. In the other rail 9B out of the pair of rails 9 as well, the sheet holding conveying side portion 101 and the returning side portion 103 extend in parallel with each other.

Moreover, a rail support device 51*a* is provided at a portion where the rails 9 are bent (a portion indicated with XVII in FIG. 18).

Figure 17:
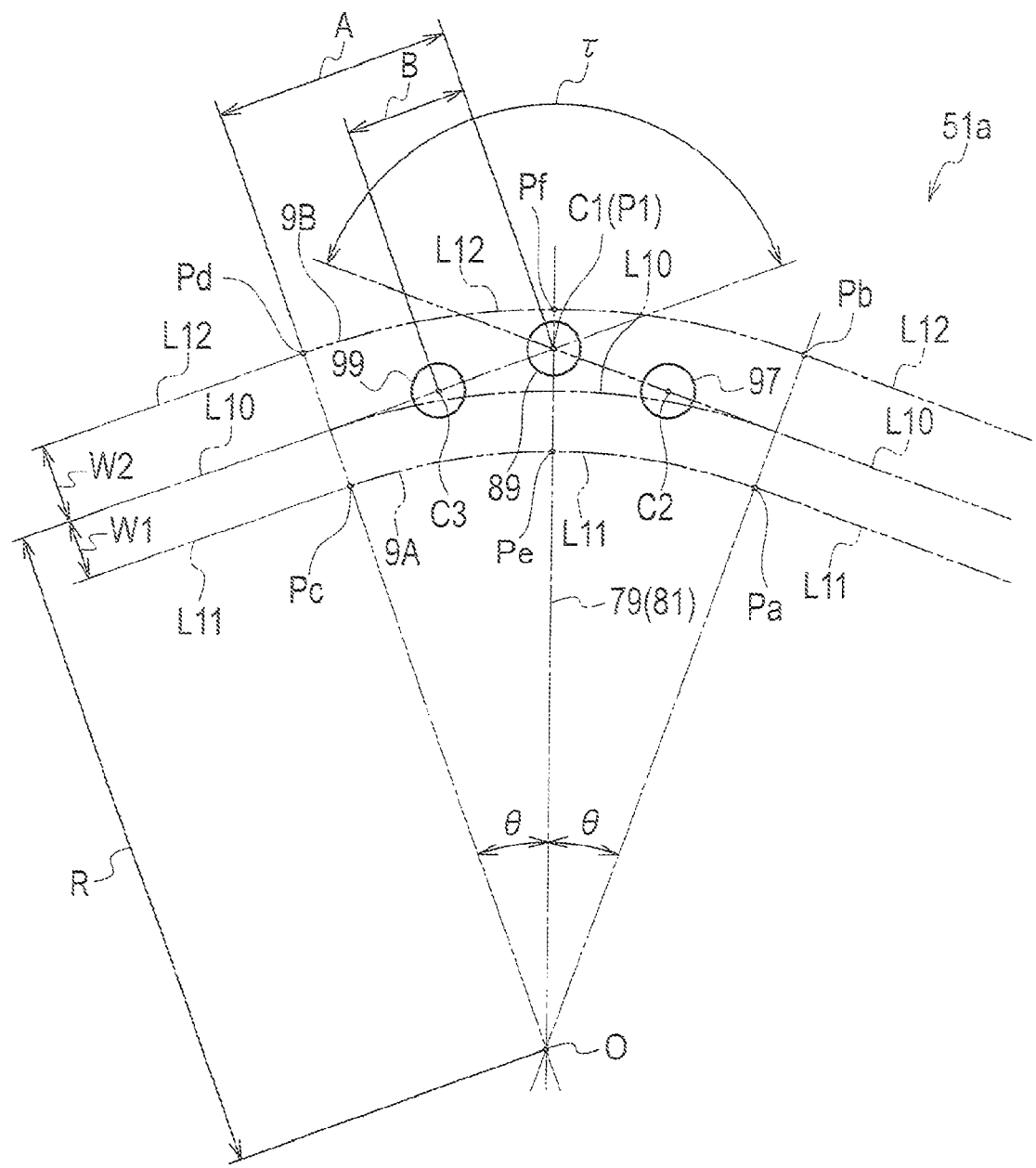
[FIG. 17]

As shown in FIG. 17 (a view obtained by simplifying the rail support device 51*a* and corresponding to FIG. 9), the sheet holding conveying side portion 101 is offset just by a distance W1 and the returning side portion 103 is offset just by a distance W2 (W2=W1 or W2≠W1). It is also possible to employ a configuration in which the sheet holding conveying side portion 101 is offset just by the distance W2 while the returning side portion 103 is offset just by the distance W1.

A line L10 shown in FIG. 17 includes the lines L4, L5, and L6 shown in FIG. 9. A line L11 is a center line of the sheet holding conveying side portion 101 of the rail 9. A line L12 is a center line of the returning side portion 103 of the rail 9.

A point Pa shown in FIG. 17 is a point on the rail 9 concerning the line L11 and corresponds to the point P2 shown in FIG. 6(*b*). A point Pb is a point on the rail 9 concerning the line L12 and corresponds to the point P2 shown in FIG. 6(*b*). A point Pc is a point on the rail 9 concerning the line L11 and corresponds to the point P3 shown in FIG. 6(*b*). A point Pd is a point on the rail 9 concerning the line L12 and corresponds to the point P3 shown in FIG. 6(*b*). Meanwhile, a point Pe shown in FIG. 6(*a*) is a point on the rail 9 concerning the line L11 and corresponds to the point P4 shown in FIG. 6(*a*) and a point Pf is a point on the rail 9 concerning the line L12 and corresponds to the point P4 shown in FIG. 6(*a*).

Formulae f181, f182, 1183, f184, f185, f186, f187, f188, and f189 can be derived by obtaining formulae concerning the configuration of the rail 9 supported by the rail support device 51*a* in FIG. 17 as in the case shown in FIG. 9 (the case of the first embodiment). As similar to the rail support device 51 according to the first embodiment, it is possible to maintain the shape of the rail 9 in the ideal are shape.

A reference numeral "(upper)" in formulae in FIG. 18 denotes the rail 9 on the line L12 shown in FIG. 17. A reference numeral "(lower)" in the respective formulae in FIG. 18 denotes the rail 9 on the line L11 shown in FIG. 17. A reference numeral "(center)" in the formulae in FIG. 18 denotes the rail 9 on the line L10 shown in FIG. 17.

(Third Embodiment)

Figure 19:
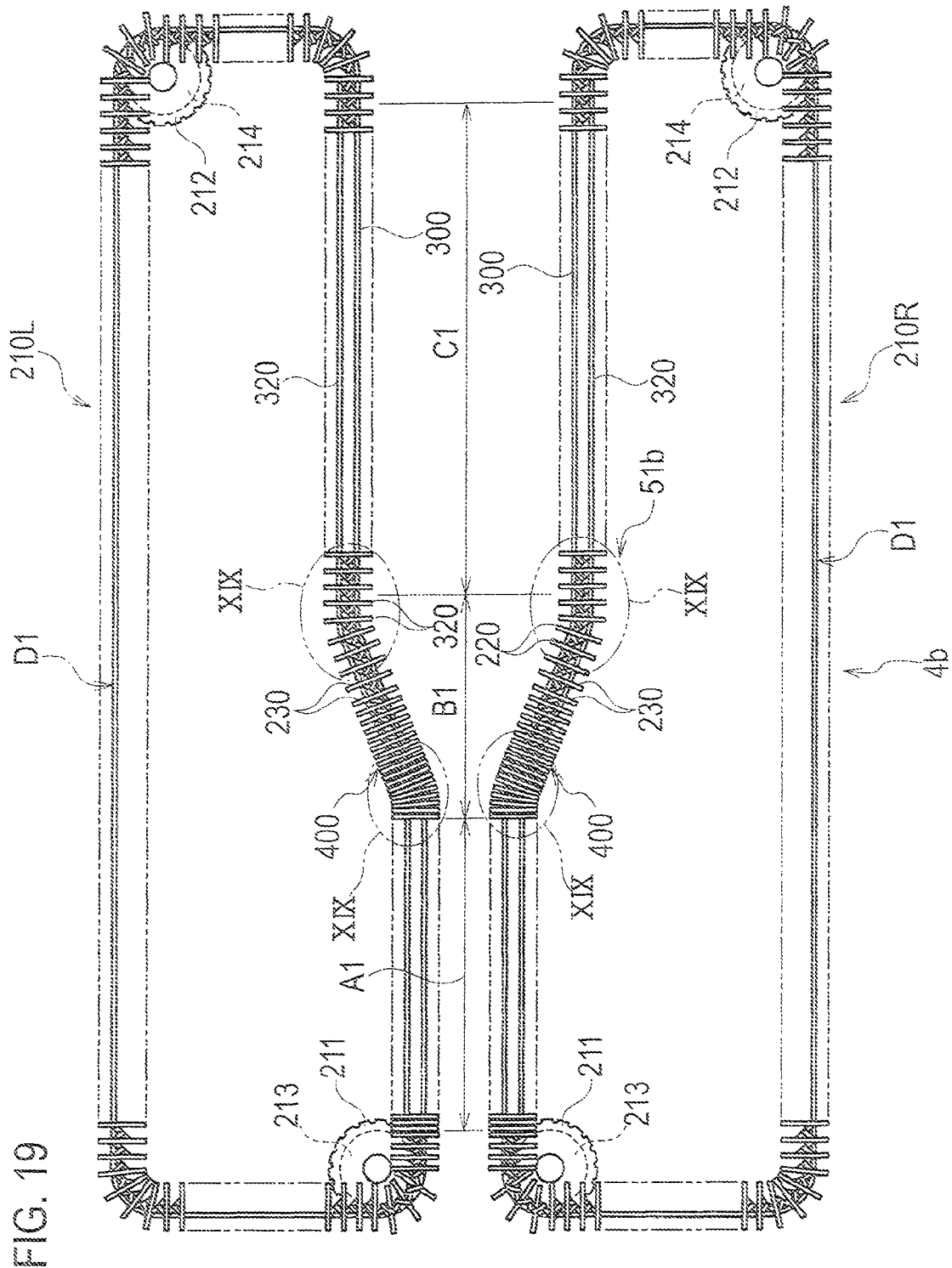
[FIG. 19]

FIG. 19 is a plan view showing a schematic configuration of a clip chain type sheet stretching apparatus 4b according to a third embodiment of the present invention.

The clip chain type sheet stretching apparatus 4b according to the third embodiment is different from the clip chain type sheet stretching apparatus 4 according to the first embodiment in that the clip chains are formed as a link as shown in Japanese Unexamined Patent Application Publication No 2006-198854, for example, and in that the sheet is stretched biaxially and simultaneously in a transverse direction (a width direction) and in a lengthwise direction (a longitudinal direction). Other features thereof are substantially similar to those of the clip chain type sheet stretching apparatus 4.

In the clip chain type sheet stretching apparatus 4b according to the third embodiment, at least two parallel rails are used in the sheet holding conveying side portion and in the returning side portion. Hence a rail support device 51b used in the clip chain type sheet stretching apparatus 4b according to the third embodiment is configured substantially similarly to the rail support device 51a according to the second embodiment.

Figure 22:
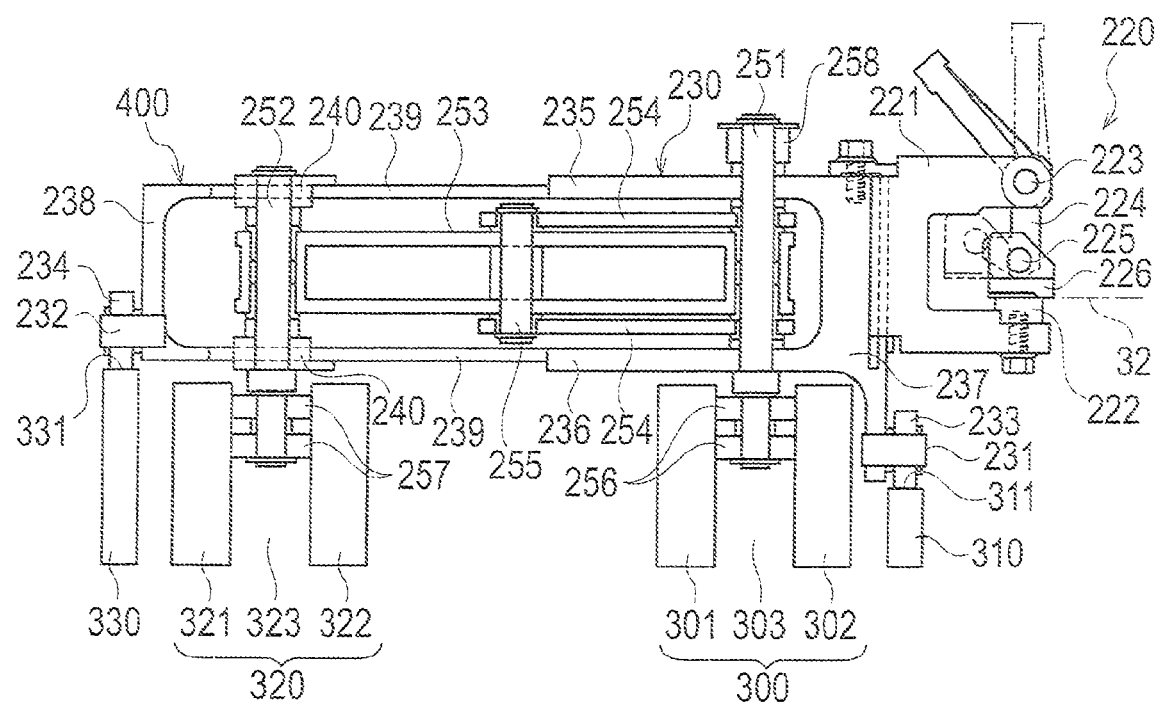
[FIG. 22]

Although details will be described later, the clip chain type sheet stretching apparatus 4b according to the third embodiment is configured to clip rollers (a roller 256 and a roller 257 shown in FIG. 22) by using a pair of rails (a pair of rails 301 and 302 or a pair of rails 321 and 322 shown in FIG. 22, for example) and thereby to guide the clip chains. Instead, it is also possible to employ a configuration to clip the rail with a pair of rollers and to guide the clip chains as similar to the clip chain type sheet stretching apparatus 4 according to the first embodiment or the clip chain type sheet stretching apparatus 4a according to the second embodiment.

The clip chain type sheet stretching apparatus 4 according to the first embodiment or the clip chain type sheet stretching apparatus 4a according to the second embodiment may employ the configuration to clip the rollers with a pair of rails and to guide the clip chains as in the clip chain type sheet stretching apparatus 4b according to the second embodiment.

Here, the clip chain type sheet stretching apparatus 4b according to the third embodiment will be described in detail.

FIG. 19 is the plan view showing the schematic configuration of the clip chain type sheet stretching apparatus 4b according to the third embodiment of the present invention.

The clip chain type sheet stretching apparatus 4b includes an endless loop 210R and an endless loop 210L which are symmetrically disposed on both of right and left sides in a plan view the endless loop 210R and the endless loop 210L each being provided with numerous clips 220 for clipping the sheet. In this embodiment, the endless loops located on the right and the left sides viewed from an entrance side of a sheet subjected to stretching will be respectively referred to as the right side endless loop 210R and the left side endless loop 210L.

The clips 220 on the right and left endless loops 210R and 210L are guided by a reference rail 300 and are circulated in a loop fashion. The right side endless loop 210R is circulated clockwise while the left side endless loop 210L is circulated counterclockwise. The left side on the FIG. 19 is the entrance side of the sheet subjected to stretching and the right side is an exit side of the sheet subjected to stretching.

A preheating zone A1, a stretching zone B1, and a heat treatment zone C1 are sequentially provided from the entrance side to the exit side of the sheet.

In the preheating zone A1, a distance of a clearance between the right and left endless loops 210R and 210L is small so as to correspond to an initial width for transverse stretch and the right and left endless loops 210R and 210L are in parallel with each other.

In the stretching zone B1, the distance of clearance between the right and left endless loops 210R and 210L is gradually expanded from the side close to the preheating zone A1 toward the heat treatment zone C1. Hence the right and left endless loops 210R and 210L are not in parallel with each other in the stretching zone B1. The distance of clearance between the right and left endless loops 210R and 210L in the stretching zone B1 is set so as to correspond to the initial width for transverse stretch at a stretch starting end (a connecting end with the preheating zone A1) and is set so as to correspond to a final width for transverse stretch at a stretch finishing end (a connecting end with the heat treatment zone C1).

In the heat treatment zone C1, a distance of a clearance between the right and left endless loops 210R and 210L is large so as to correspond to the final width for transverse stretch and the right and left endless loops 210R and 210L are in parallel with each other.

Next, a detailed structure of the clip chain type sheet stretching apparatus 4b according to this embodiment will be described with reference to FIG. 20 to FIG. 23.

Figure 23:
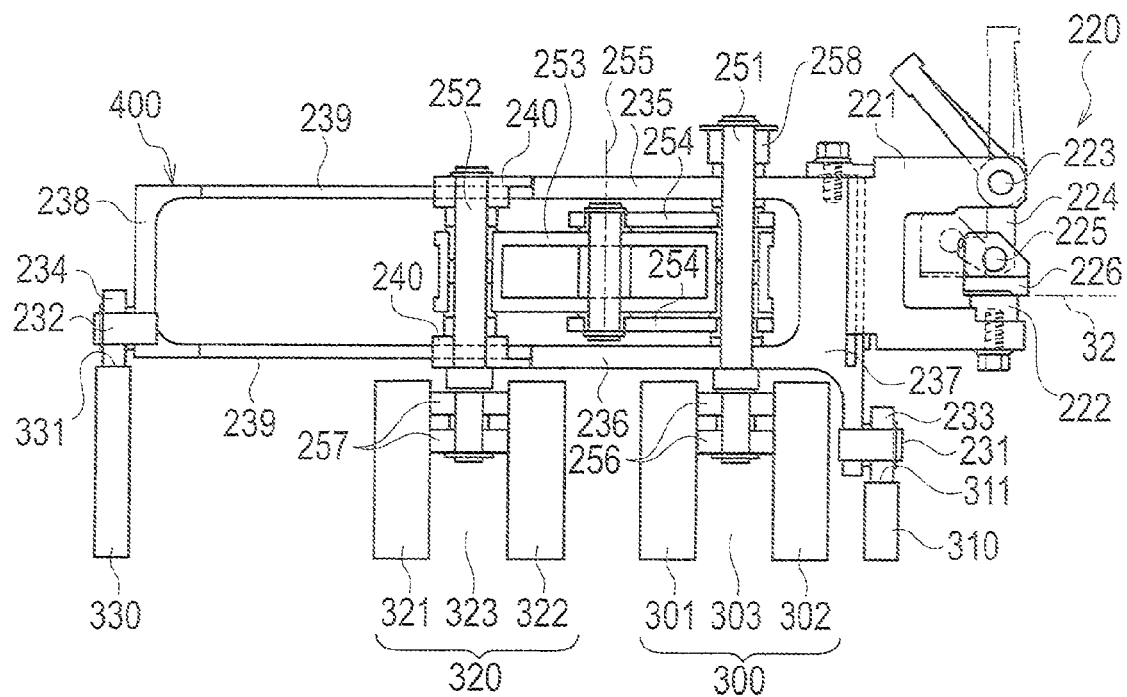
[FIG. 23]

The multiple clips 220 in the right and left endless loops 210R and 210L is attached, to one end portions (on a front side) in a longitudinal direction of respective clip holding members 230 having a rectangular shape. The clip 220 is configured to releasably clip the sheet 32. As shown in FIG. 22 and FIG. 23, the clip 220 includes a clip body 221 in a yoke shape, a lower side fixed clip member 222 fixed and attached to a lower side of this clip body 221, a movable lever 224 rotatably attached to the clip body 221 by using a pin 223, and an upper side movable clip member 226 swingably attached to a lower end of this movable lever 224 by using a pin 225. A side edge of the sheet 32 is sandwiched between and clipped by the lower side fixed clip member 222 and the upper side movable clip member 226.

The clip holding members 230 are configured to hold the respective clips 220. There are the clip holding members 230 in the same number as the number of the clips 220. The clip holding member 230 is formed into a rigid frame structure (see FIG. 22 and FIG. 23) having a closed cross section by an upper beam 235, a lower beam 236, a front wall 237, and a rear wall 238. Running wheels 233 and 234 are rotatably provided on both ends (the front wall 237 and the rear wall 232) of the clip holding member 230 by using shafts 231 and 232, respectively. The running wheel 233 rotated on a horizontal running road surface 311 formed on an upper surface of a support tail 310 while the running wheel 234 is rotated on a horizontal running road surface 331 formed on an upper surface of a support rail 330. The running road surfaces 311 and 331 are in parallel with the entire reference rail 300.

Elongated holes (holes in an elongated shape) 239 being elongated in the longitudinal direction are formed on other end sides (rear sides) of the upper beam 235 and the lower beam 236 of each of the clip holding members 230. A slider 240 is engaged with each of the upper and lower elongated holes 239 so as to be slidable in the longitudinal direction of the elongated hole 239.

Here, the reference rail 300 and a pitch setting rail 320 will be described.

The reference rail 300 is formed of a pair of groove forming rails 301 and 302 facing each other with a groove 303 therebetween, and is disposed in the vicinity of the support rail 310.

The pitch setting rail 320 is formed of a pair of groove forming rails 321 and 322 facing each other with a groove 323 therebetween, and is disposed in the vicinity of the support rail 330.

A single first shaft member 251 penetrating the upper beam 235 and the lower beam 236 is vertically provided in the vicinity of one end portion ton the clip 220 side) of each of the clip supporting members 220 described above. A single second shaft member 252 is provided so as to vertically penetrate the upper and lower sliders 240 of each of the clip supporting members 230.

One end of a main link member 253 is pivotally connected to the first shaft member 251 of each of the clip holding members 230. Another end of the main link member 253 is pivotally connected to the second shaft member 252 of the adjacent clip supporting member 230.

In addition to the main link member 253, one end of a sub link member 254 is pivotally connected to the first shaft member 251 of each of the clip holding members 230. Another end of the sub link member 254 is pivotally connected to an intermediate portion of the main link member 252 by use of a pivot shaft 255.

Figure 20:
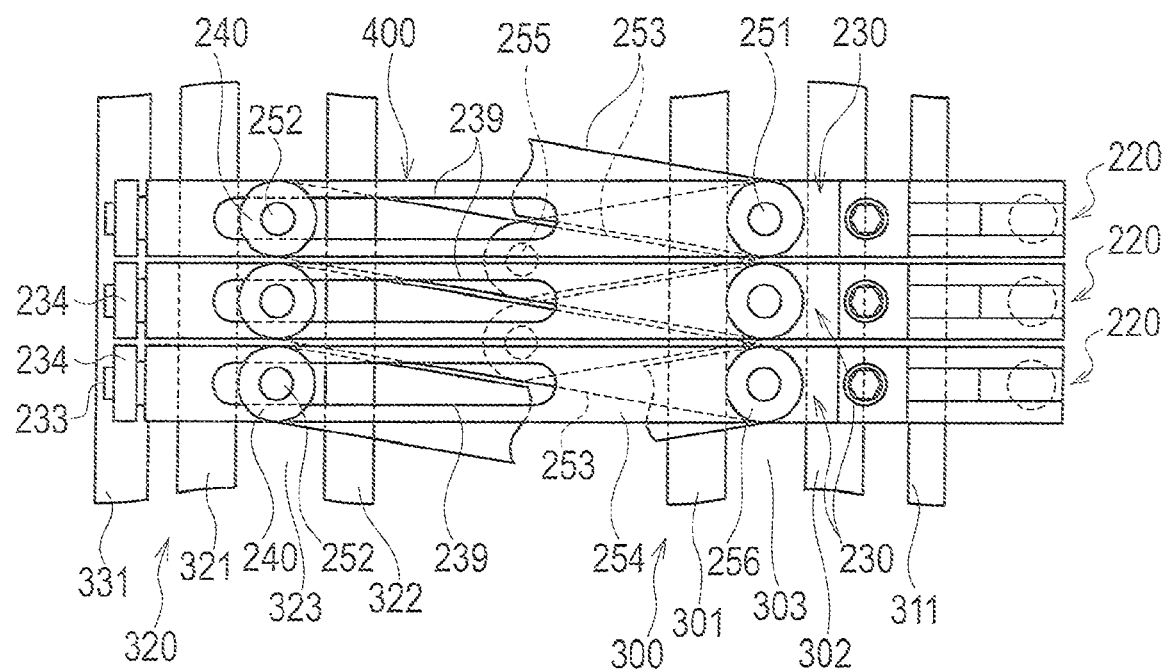
[FIG. 20]
Figure 21:
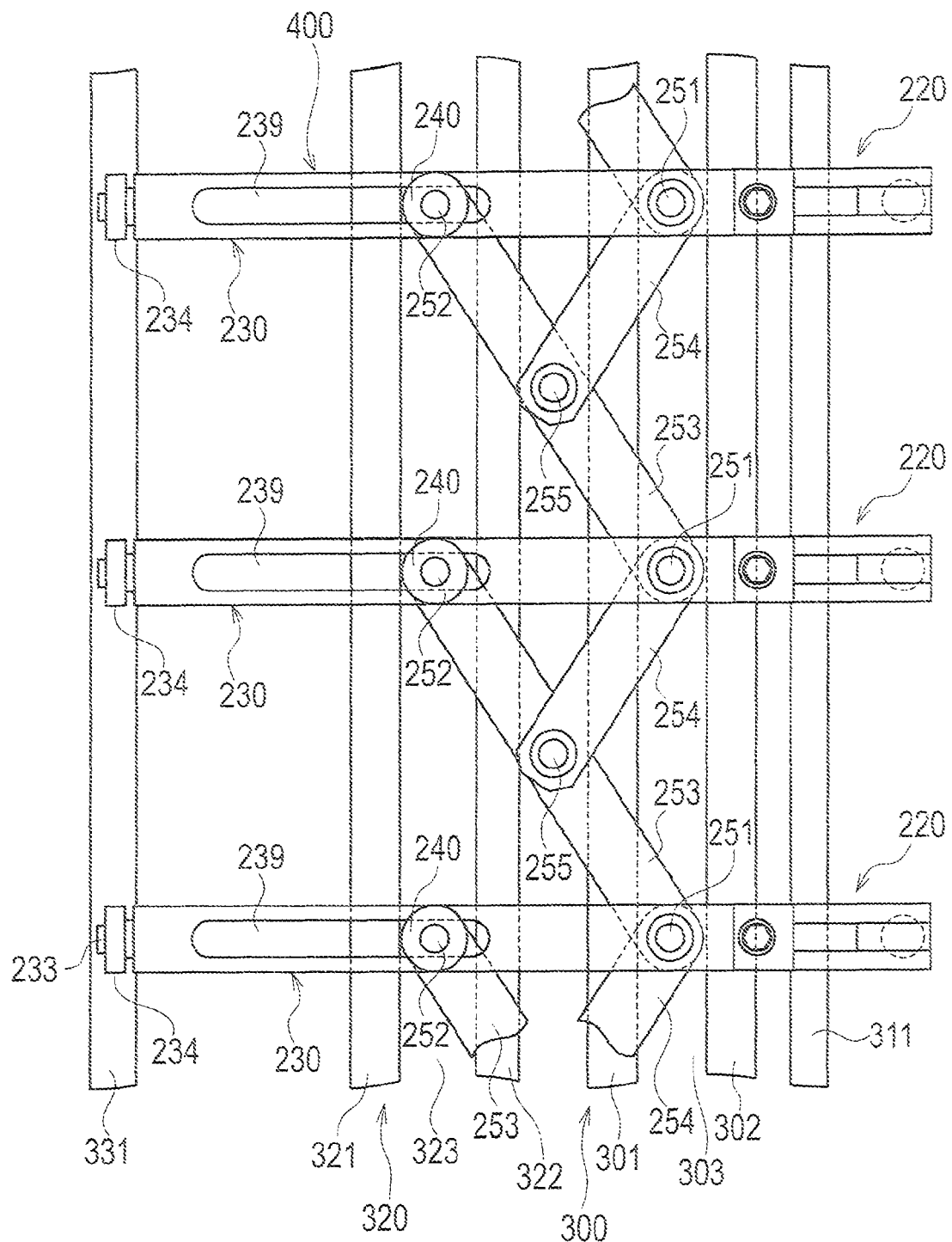
[FIG. 21]

By a link mechanism including the main link member 253 and the sub link member 254, a pitch (a clip MD pitch) between the clip holding members 230 becomes smaller as the slider 240 moves closer to the other end side (away from the clips 220) of the clip holding members 230 as shown in FIG. 20, and the pitch between the clip holding members 230 becomes greater as the slider moves close to the one side (closer to the clips 220) of the clip holding members 230 as shown in FIG. 21.

In this embodiment, a minimum pitch between the clip holding members 230 is determined by allowing the adjacent clip holding members 230 to contact each other as shown in FIG. 20, and a maximum pitch between the clip holding members 230 is determined by allowing the slider 240 to reach a stroke end on the one end side (closer to the clips 220) of the clip holding members 230.

A guide roller (a first engaging element) 256 is rotatably provided at a lower end of the first shaft member 251. The guide roller 256 is engaged with the groove 303 of the reference rail 300 which defines a circulating route of the clips 220. A drive roller 258 is rotatably provided at an upper end of the first shaft member 251. Here, the width of the groove 303 of the reference rail 300 is formed slightly greater than an outside diameter of the guide roller 256.

The drive roller 258 is selectively engaged with drive sprockets 211 and 212 (see FIG. 19) so as to run each of the clip holding members 230 along the circulation route. That is, the drive sprockets 211 and 212 are selectively engaged with the drive rollers 258 of the respective clip holding members 230 and rotated by electric motors 213 and 214 (see FIG. 19) so as to apply a force to the clip holding members 230 so as to run the respective clip holding members 230 along the circulation route.

A pitch setting roller (a second engaging element) 257 is rotatably provided at a lower end of the second shaft member 252. The pitch setting roller 257 is engaged with a groove 323 of the pitch setting rail 320 provided along the reference rail 300, thereby setting the position of the slider 240 in the elongated hole 239. The width of the groove 323 of the reference rail 320 is formed slightly greater than an, outside diameter of the pitch setting roller 257.

The pitch setting rail 320 has a function to determine the position of the slider 240 in the elongated hole 239 by way of a distance of a clearance with the reference rail 300. In this way, the pitch setting rail 320 variably sets up the pitch between the adjacent clip holding members 230. The pitch setting rail 320 moves the slider 240 to the other end side (away from the clips 220) of the clip holding members 230 to reduce the pitch between the clip holding members 230 as the distance of clearance with the reference rail 300 is longer, i.e., as the pitch rail 320 recedes from the reference rail 300. The pitch setting rail 320 moves the slider 240 to the one end side (closer to the clips 220) of the clip holding members 230 to increase the pitch between the clip holding members 230 as the distance of clearance with the reference rail 300 is shorter, i.e., as the pitch rail 320 comes close to the reference rail 300.

The pitch setting rail 320 will be described with reference to FIG. 19.

The distance of clearance between the pitch setting rail 320 and the reference rail 300 is set evenly to a maximum value of minimum pitch setting across the entire preheating zone A1.

In the stretching zone B1, the distance of clearance between the pitch setting rail 320 and the reference rail 300 is set to the maximum value of the minimum pitch setting at the stretch starting end (the connecting end with the preheating zone A1). The distance gradually becomes shorter from this point toward the stretch finishing end, and is set to a minimum value of maximum pitch setting at the stretch finishing end.

The distance of clearance between the pitch setting rail 320 and the reference rail 300 is set evenly to the minimum value of the maximum pitch setting across the entire heat treatment zone C1.

A link chain 400 will be described.

As understood already, the link chain 400 has a rectangular shape and is formed annularly. The link chain 400 includes clips 320 configured to clip the sheet 32 on one end portion in the longitudinal direction, a multiple clip holding members 230 provided with elongated holes which are elongated in the longitudinal direction on the other end portion, the first shaft members 251 each being provided in the vicinity of one end portion of each of these clip holding members 230, the sliders 240 each being slidably engaged with each of the elongated holes 239 on the clip holding members 230, the second shaft members 252 each being provided at the slider 240 of each of the clip holding members 230, the main link members 253 each having one end pivotally connected to the first shaft member 251 of each of the clip holding members 230 and another end pivotally connected to the second shaft member 252 of the adjacent clip holding member 230, and the sub link members 254 each having one end pivotally connected to the first shaft member 251 of each of the clip holding members 230 and another end pivotally connected to the intermediate portion of each of the main link members 253.

Next, operations of the clip chain type sheet stretching apparatus 4b having the above-described configuration will be described:

The drive sprockets 211 and 212 of the right side endless loop 210R are respectively rotated clockwise by the electric motors 213 and 214 and the drive sprockets 211 and 212 of the left side endless hoop 210L are respectively rotated counterclockwise by the electric motors 213 and 214. A moving forte is applied to the clip holding members 230 of the drive rollers 258 engaged with these drive sprockets 211 and 212. In this way, the right side endless loop 210R is circulated Clockwise while the left side endless loop 210L is circulated counterclockwise, whereby the sheet 32 subjected to stretching is taken from the left side (the entrance side) in view of the sheet surface of FIG. 19 into the clearance between the right and left endless Loops 210R and 210L.

At this entrance for taking the sheet in, both of side edges of the sheet 32 are clipped (clipped on) by the clips 220 of the right and left endless loops 210R and 210L. The sheet 32 firstly enters the preheating zone A1 by the running motions of the right and left endless loops 210R and 210L, that is, movements of the clip holding members 230 guided by the reference rail 300.

In the preheating zone A1, only preheating is executed without performing transverse stretch or longitudinal stretch because the distance of clearance between the right and left endless loops 210R and 210L is small so as to correspond to the initial width for transverse stretch and the right and left endless loops 210R and 210L are arranged in parallel with each other, and because the distance of clearance between the pitch setting rail 320 and the reference rail 300 is set to the maximum value of minimum pitch setting evenly throughout the entire portion.

After the preheating, the sheet 32 enters the stretching zone B1. In the stretching zone B1, the sliders 240 gradually moves to the one end side (close to the clips 220) of the clip holding members 230 and the pitch between the clip holding members 230 is, gradually increased because the distance of clearance between the right and left endless loops 210R and 210L is gradually expanded from the preheating zone A1 side toward the heat treatment zone C1 and because the distance of clearance between the pitch setting rail 320 and the reference rail 300 is gradually reduced from the preheating zone A1 side toward the heat treatment zone C1. In this way, longitudinal stretch is performed simultaneously with transverse stretch.

As the sheet 32 passes through the stretching zone B1, the sheet 32 is subjected, to simultaneous biaxial stretch including transverse stretch and longitudinal stretch. After finishing the stretch, the sheet enters the heat treatment zone C1. In the heat treatment zone C1, only heat treatment such as temperature adjustment is executed without performing transverse stretch or longitudinal stretch because the distance of clearance between the right and left endless loops 210R and 210L is large so as to correspond to the final width for transverse stretch and the right and left endless loops 210R and 210L are arranged in parallel with each other throughout the entire portion, and because the distance of clearance between the pitch setting rail 320 and the reference rail 300 is set to the minimum value of maximum pitch setting evenly throughout the entire portion.

At an exit located at a terminal end of the heat treatment zone C1, the clipping of the sheet 32 by the clips 220 of the right and left endless loops 210R and 210L is released (clipped off), whereby the sheet 32 travels straight and the clip holding members 230 are guided by the reference rail 300 and circulated in a loop fashion.

In the above-described operations, each clip 220 is provided on the clip holding member 230 and one end of the main link member 253 and one end of the sub link member 254 are pivotally connected to the first shaft member 251 on the clip 220 side of the clip holding member 230 so as to form a reference link on the clip 220 side, thereby establishing the structure which does not require the chain link. Accordingly, it is possible to perform simultaneous biaxial stretch at a high magnitude and at high precision without causing an increase in the angular change of the clip relative to the sheet (the sheet clipped by the clip) at a bent portion of the guide rail (the reference rail 300) configured to change a transverse stretch width or causing an increase in the fluctuation of a clip position clearance (the clip MD pitch) in the longitudinal direction of the sheet (a MD direction).

Meanwhile, since the reference link is formed on the clip 320 side, it is possible to avoid an increase in the radius of a bent portion of the reference rail 300 or an increase in the moment for bearing a stretching force in the longitudinal direction (the MD direction). Moreover, due to the structure without the chain link, the number of components is reduced and there is not a risk of causing an operation failure such as the chain link being reversely bent immediately after stretching.

In the clip chain type sheet stretching apparatus 4b configured as described above, the rail support device 51b is located in a portion X1 shown in FIG. 1.

Here, a modified example of the above-described respective rail support devices will be explained.

Figure 24:
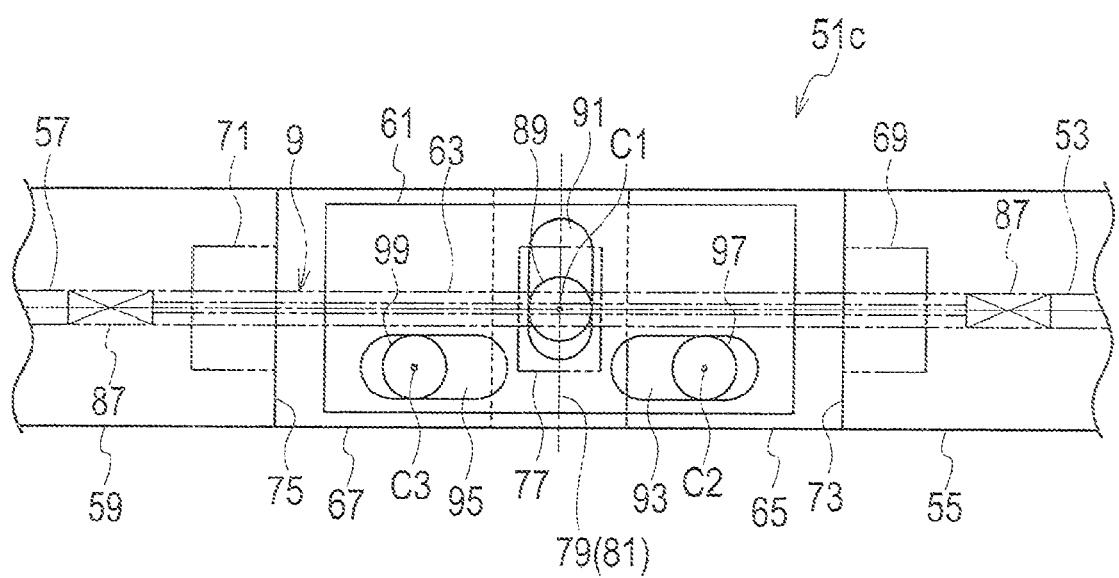
[FIG. 24]

FIG. 24 is a plan view showing a rail support device 51c according to the modified example and corresponding to FIG. 4(a).

The rail support device 51c according to the modified example is different from the rail support devices shown in FIG. 4(a), FIG. 17, and the like in that the second axis C2 and the third axis C3 are offset. Other features are substantially similar to the rail support devices shown in FIG. 4(a), FIG. 17, and the like.

Figure 25:
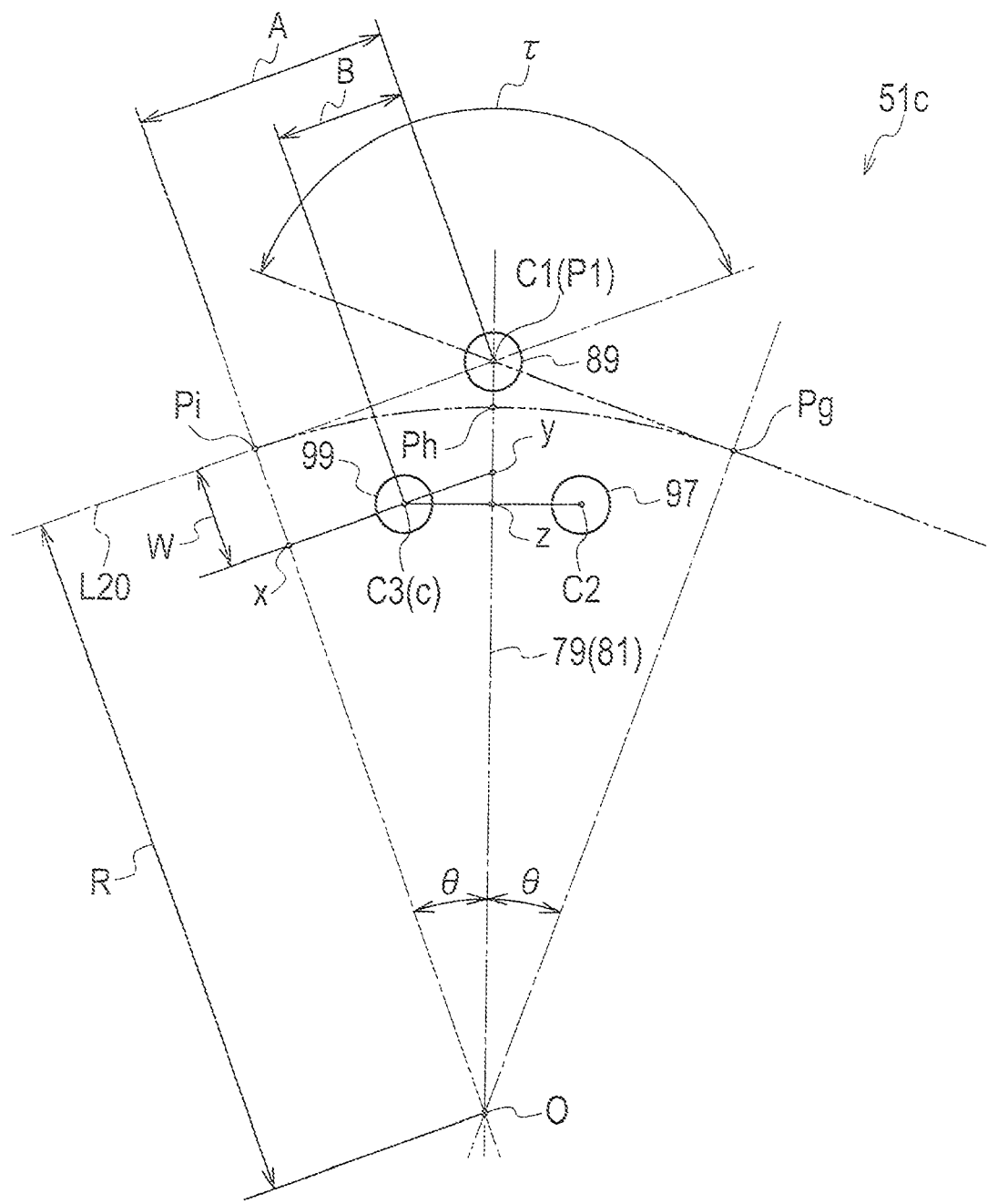
[FIG. 25]

Specifically, in the rail support device 51c, the second shaft C2 and the third shaft C3 are offset just by a distance W from a center line L20 (the line corresponding to lines L4, L5, and L6 shown in FIG. 9) of the rail 9 as shown in FIG. 24 and FIG. 25 (which is a view being obtained by simplifying FIG. 24 and corresponding to FIG. 5 and FIG. 17).

A point Pg shown in FIG. 25 is a point on the rail 9 concerning the line L20 and corresponds to the point P2 shown in FIG. 6(b). A point Pi is a point on the rail 9 concerning the line L20 and corresponds to the point P3 shown in FIG. 6(b). A point Ph is a point on the rail 9 concerning the line L20 and corresponds to the point P9 shown in FIG. 6(a).

Referring to FIG. 25, by obtaining distances P (upper), P (center), and P (lower) from the center O to the rail support portion (the rail support portion of the arc shaped rail support member 61) 77 of the arc shaped portion 63 of the rail 9, it is possible to derive formulae f261, f262, f263, f264, f265, f266, f267, and f268 shown in FIG. 26 as well as formulae f271, f272, f273, f279, f275, and f276 shown in FIG. 27.

Here, "+W(1−cos θ)" in the last term in the formula f268 "−W(1−cos θ)" in the last term in the formula f276 represents an error relative to the rail support device 51 according to the first embodiment or the like.

Specifically, as compared to the case (P (center)) where guide pins (the central axes C2 and C3) are present on the center line L20 of the rail 9, the error of "+W(1−cos θ)" is generated when the guide pins are offset downward (toward the center O) just by the distance W as shown in FIG. 24 and FIG. 25 (in P (lower)), and the error of "−W(1−cos θ)" is generated when the guide pins are offset upward (to the opposite side of the center O) just by the distance W as shown in FIG. 24 and FIG. 25 (in P (upper)).

It is possible to obtain respective formulae f281, f282, f283, f289, f285, f286, and f287 shown in FIG. 28 by investigating how large these errors are. Here, in the formulae shown in FIG. 28 B=A/2.

Tables (a), (b), and (c) shown in FIG. 29 can be obtained by appropriately substituting the values θ to the formulae shown in FIG. 28. Note that "Pcen" shown in FIG. 29 represents P (center), that "Plow" therein represents P (lower), and that "Pupil" therein represents P (upper).

Moreover, formulae f301, f302, f303, f304, and 1305 shown in FIG. 30 will be derived by obtaining the values B for "R=P" while setting some offset values W. Tables (a) and (b) shown, in FIG. 31 can be obtained by appropriately substituting the values θ into the formulae shown in FIG. 30. Note that the formula f304 shown in FIG. 30 is the formula for the case of the formula f302 (the case of P (lower)) and that the formula f305 is the formula for the case of the formula f303 (the case of P (upper)). Meanwhile, the "P" shown in FIG. 31(*b*) represents P (upper).

Accordingly, it is possible to understand that the guide pins (the center axes C2 and C3) can be displaced from the center line L20 of the rail 9 by appropriately selecting the offset value W and the like.

Moreover, in the embodiments described above, it is not always necessary that the first axis C1 (the rotational center) be located in the center (on the center line) of the first rail support member 55 and the second rail support member 57. Instead, the first axis C1 may be located close to an end portion in the width direction of the first and second rail support members 55 and 57. This configuration is equivalent to offsetting the axes C1, C2, and C3 of the first embodiment in the second embodiment (equivalent to offsetting the axes C1, C2, and C3 relative to the respective lines L11 and L12) and can be understood therefrom.

It is to be noted that the present invention may also be understood as a sheet stretching method of stretching a sheet by using the clip chain type sheet stretching apparatus provided with any of the rail support devices described above.

The invention claimed is:

1. A rail support device installed in a clip chain type sheet stretching apparatus configured to hold an end portion in a transverse direction of a sheet by using clips of clip chains, and to stretch the sheet while conveying the sheet by running the clip chains in a horizontal direction along a rail, the rail support device configured to support the rail and comprising:
   a first rail support member configured to support a first straight portion of the rail;
   a second rail support member configured to support a second straight portion of the rail in a direction intersecting the first straight portion; and
   an arc shaped rail support member configured to support an arc shaped portion of the rail connecting the first and second straight portions to each other, wherein
   the first rail support member includes a first connecting portion and a first straight rail support portion being a portion other than the first connecting portion,
   the second rail support member includes a second connecting portion and a second straight rail support portion being a portion other than the second connecting portion,
   the first connecting portion and the second connecting portion are engaged with each other,
   the second rail support member is rotatable relative to the first rail support member about a first axis extending in a vertical direction at the first and second connecting portions,
   the first and second rail support members respectively support the first and second straight portions by the first and second straight rail support portions with longitudinal directions of the first and second rail support members respectively set to coincide with longitudinal directions of the first and second straight portions,
   the arc shaped rail support member is engaged with at least one of the first connecting portion and the second connecting portion so as to rotate relative to the at least one connection portion about the first axis and to move relative to the at least one connection portion along a first straight line passing through the first axis and extending in the horizontal direction,
   the arc shaped rail support member is engaged with the first connecting portion so as to rotate relative to the first connecting portion about a second axis extending in the vertical direction at the first connecting portion and to move relative to the first connecting portion along a second straight line passing through the second axis and extending in the horizontal direction,
   the arc shaped rail support member is engaged with the second connecting portion so as to rotate relative to the second connecting portion about a third axis extending in the vertical direction at the second connecting portion and to move relative to the second connecting portion along a third straight line passing through the third axis and extending in the horizontal direction,
   the first axis exists in an intersection angle bisecting plane developing in the vertical direction and including an intersection angle bisector being a straight line passing through an intersection point between an extended line of the first straight portion and an extended line of the second straight portion and extending in the horizontal direction while bisecting an intersection angle of the extended lines of the first and second straight portions,
   the arc shaped rail support member supports the arc shaped portion of the rail in the intersection angle bisecting plane,
   the first straight line extends in a direction of extension of the intersection angle bisector,
   the first rail support member and the second rail support member are symmetrical to each other with respect to the intersection angle bisecting plane,
   the second straight line extends in the horizontal direction intersecting with the intersection angle bisecting plane, and
   the third straight line and the second straight line are symmetrical to each other with respect to the intersection angle bisecting plane.

2. The rail support device according to claim 1, wherein
   the first straight rail support portion supports the first straight portion at least at a boundary with the first connecting portion in the longitudinal direction of the first rail support member, and
   a distance between the intersection angle bisecting plane and the second axis in the longitudinal direction of the first rail support member is 0.50 to 0.59 times as long as a distance between the intersection angle bisecting plane and the boundary.

3. The rail support device according to claim 1, wherein
   the first straight rail support portion supports the first straight portion at least at a boundary with the first connecting portion in the longitudinal direction of the first rail support member, and
   a distance between the intersection angle bisecting plane and the second axis is 0.50 times as long as a distance between the intersection angle bisecting plane and the boundary.

4. The rail support device according to claim 1, wherein the rail is straight and passes along the first axis when an intersection angle between the first straight portion and the second straight portion is 180°.

5. The rail support device according to claim 1, wherein
   the first rail support member and the second rail support member are rotatable about the first axis by using a columnar first shaft member,
   the arc shaped rail support member includes a first elongated hole, a second elongated hole, and a third elongated hole,
   the arc shaped rail support member with the first elongated hole engaged with the first shaft member is engaged with the first and second connecting portions so as to rotate about the first axis and move along the first straight line relative to the first and second connecting portions, the arc shaped rail support member with the second elongated hole engaged with a columnar second shaft member provided at the first connecting portion is engaged with the first connecting portion so as to rotate about the second axis and move along the second straight line relative to the first connecting portion, and the arc shaped rail support member with the third elongated hole engaged with a columnar third shaft member provided at the second connecting portion is engaged with the second connecting portion so as to rotate about the third axis and move along the third straight line relative to the second connecting portion.

* * * * *